United States Patent [19]

Yoshinobu et al.

[11] Patent Number: 5,686,954
[45] Date of Patent: Nov. 11, 1997

[54] PROGRAM INFORMATION BROADCASTING METHOD PROGRAM INFORMATION DISPLAY METHOD, AND RECEIVING DEVICE

[75] Inventors: Hitoshi Yoshinobu, Kanagawa; Tsukasa Yoshimura, Tokyo; Yoshitsugu Hattori, Tokyo, all of Japan

[73] Assignee: Sony Corporation, Tokyo, Japan

[21] Appl. No.: 469,331

[22] Filed: Jun. 6, 1995

[30] Foreign Application Priority Data

Sep. 29, 1994 [JP] Japan .................. 6-259386

[51] Int. Cl.⁶ .................................. H04N 7/14
[52] U.S. Cl. ............... 348/13; 348/906; 348/569; 348/460
[58] Field of Search ............... 348/6, 7, 12, 13, 348/569, 906, 473, 460; 955/4.1, 4.2, 5.1, 3.1; H04N 7/14

[56] References Cited

U.S. PATENT DOCUMENTS

| | | | |
|---|---|---|---|
| 4,329,684 | 5/1982 | Monteath et al. | 340/707 |
| 4,390,901 | 6/1983 | Keiser | 358/147 |
| 4,488,179 | 12/1984 | Kruger et al. | 358/181 |
| 4,635,121 | 1/1987 | Hoffman et al. | 358/188 |
| 4,706,121 | 11/1987 | Young | 358/142 |
| 4,751,578 | 6/1988 | Reiter | 348/906 |
| 4,977,455 | 12/1990 | Young | 348/906 |
| 5,038,211 | 8/1991 | Hallenbeck | 358/142 |
| 5,077,607 | 12/1991 | Johnson et al. | 358/84 |
| 5,151,789 | 9/1992 | Young | 358/194.1 |
| 5,191,410 | 3/1993 | McCalley et al. | 358/86 |
| 5,231,493 | 7/1993 | Apitz | 348/468 |
| 5,243,588 | 9/1993 | Maeda et al. | 369/54 |
| 5,299,006 | 3/1994 | Kim | 348/571 |
| 5,532,754 | 7/1996 | Young et al. | 348/569 |
| 5,541,738 | 7/1996 | Mankovitz | 348/906 |
| 5,552,833 | 9/1996 | Henmi et al. | 348/906 |

*Primary Examiner*—Victor R. Kostak
*Attorney, Agent, or Firm*—Harold T. Fujii; Jerry A. Miller

[57] ABSTRACT

A plurality of classification items each including a plurality of detailed items for recognizing broadcasting programs per se and program elements included in each of the broadcasting programs are provided wherein the contents of each of the broadcasting programs are represented by the classification items and the detailed items that are respectively represented by the identification data are used to form scheduled program information. The scheduled program information is broadcast together with the corresponding table data for the identification data and the data for character display of the classification items and the detailed items corresponding to the identification data. Program schedules for various kinds of broadcasting programs can be broadcast with a reduced amount of data.

44 Claims, 20 Drawing Sheets

| PROGRAM | PAY | FIND | SET UP | |
|---|---|---|---|---|
| CH △ | PM 7:00 | PM 8:00 | PM 9:00 | |
| A B C | Coast to Coast | Drama Mr. Postman | Drama LONGEST TIME | |
| C B S | Twin Peaks Special | Movie Star WARS | | |
| M T V | TOP 40'S YUMMING, DREAM COMES TRUE | HEAVY METAL ROCK | Country Western | ←TBL |
| C N N | Today's News | Stock Market | | |
| H B O | Kitchenware Katalog | Jewelry Katalog | | |
| CH ▽ | | | | |

FIG. 1A BROADCASTING FREQUENCY

| 11 | 12 | 13 | 14 | 15 |
|---|---|---|---|---|
| VIDEO DATA PACKET MPEG1 or MPEG2 (NOT PROVIDED FOR MUSIC CH) | AUDIO DATA PACKET MPEG/AUDIO | SCHEDULED PROGRAM INFORMATION PACKET (ONLY FOR MAIN CHANNEL) | PROGRAM APPENDED INFORMATION PACKET | OTHER PACKETS |

FIG. 1B INDEX DATA

| 21 | 22 | 23 | 24 | 25 |
|---|---|---|---|---|
| CURRENT TIME | CHANNEL ALLOCATED INFORMATION | SCHEDULED PROGRAM INFORMATION (FOR ALL CHs) | LIST DATA CORRESPONDING TO ID | OTHERS |

FIG. 1C LIST DATA CORRESPONDING TO ID

| 31 | 32 | 33 | 34 | 35 | 36 |
|---|---|---|---|---|---|
| HIERARCHICAL MENU ORDER IN ITEMS | LIST DATA FOR THE KIND OF ITEMS | LIST DATA CORRESPONDING TO THE PROGRAM TITLE ID | LIST DATA CORRESPONDING TO SUBTITLE ID | LIST DATA CORRESPONDING TO PERFORMER ID | LIST DATA CORRESPONDING TO CATEGORY ID | OTHERS |

FIG. 3

LIST TABLE FOR THE KIND OF ITEMS

| | | |
|---|---|---|
| | TABLE HEADER | ~Htb |
| SZ~ | SIZE | 38 |
| 37~ | 0000 | TITLE\n |
| | 0001 | SUB TITLE\n |
| | 0002 | CATEGORY\n |
| | 0003 | GUEST STARING\n |
| | ⋮ | ⋮ |
| | 00** | OTHERS |

FIG. 4

LIST TABLE FOR TITLE ID

| | | |
|---|---|---|
| | 0000 | ~Htb |
| SZ~ | SIZE | 38 |
| 37~ | 0000 | Today's News\n |
| | 0001 | Coast to Coast\n |
| | 0002 | Mr Postman\n |
| | ⋮ | ⋮ |
| | STOPPER | |

FIG. 5

| | |
|---|---|
| 0001 | ~Htb |
| SIZE | ~SZ |
| 0000 | - KABUTO-CHO NOW - \n |
| 0001 | - 60's Old fashioned songs - \n |
| 0002 | - 1st chapter - \n |
| ... | ... |
| STOPPER | |

37 — left column, 38 — right column

FIG. 6

| | |
|---|---|
| 0005 | ~Htb |
| 7CB2 | ~SZ |
| 00 00 | DREAM COMES TRUE\n |
| 00 01 | YUMING (YUMI MATSUTOHYA)\n |
| 00 02 | DEEP PURPLE\n |
| 00 03 | FRANK ZAPPA\n |
| ... | ... |
| FE FF | ????\n |
| STOPPER | |

37 — left column, 38 — right column

FIG. 7

LIST DATA CORRESPONDING TO PROGRAM CATEGORY ID

| | | |
|---|---|---|
| 0001 | | ~ Htb |
| 03E2 | | ~ SZ |
| 00 | 00 | NEWS \n ~38 |
| 00 | 01 | POLITICAL NEWS \n |
| 00 | 02 | SPORTS NEWS \n |
| 00 | 03 | STOCK MARKET \n |
| 03 | 00 | MOVIE \n |
| 03 | 01 | LOVE STORY \n |
| 03 | 02 | ACTION \n |
| 03 | 03 | SCIENCE FICTION \n |
| 08 | 00 | MUSIC VIDEO \n |
| 08 | 01 | HARD ROCK \n |
| 08 | 02 | BRITISH ROCK \n |
| 08 | 03 | COUNTRY \n |
| FE | FF | OTHERS \n |
| STOPPER | | |

37 points to the 00 00 NEWS row.

FIG. 15

| PROGRAM | PAY | FIND | SET UP |
|---|---|---|---|
| | PM 7:00 | PM 8:00 | PM 9:00 |
| ABC | Coast to Coast | Drama Mr. Postman | Drama LONGEST TIME |
| CBS | Twin Peaks Special | Movie Star WARS | |
| MTV | TOP 40'S YUMMING, DREAM COMES TRUE | HEAVY METAL ROCK | Country Western |
| CNN | Today's News | Stock Market | |
| HBO | Kitchenware Katalog | Jewelry Katalog | |

TBL

F I G. 17A
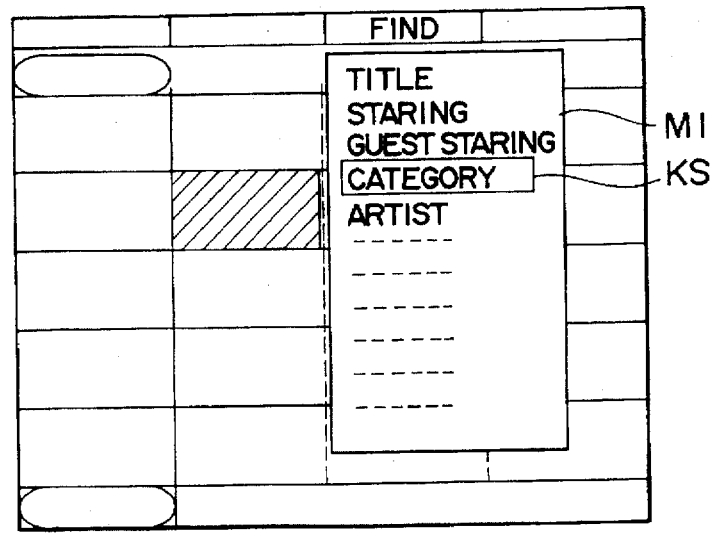
F I G. 17B
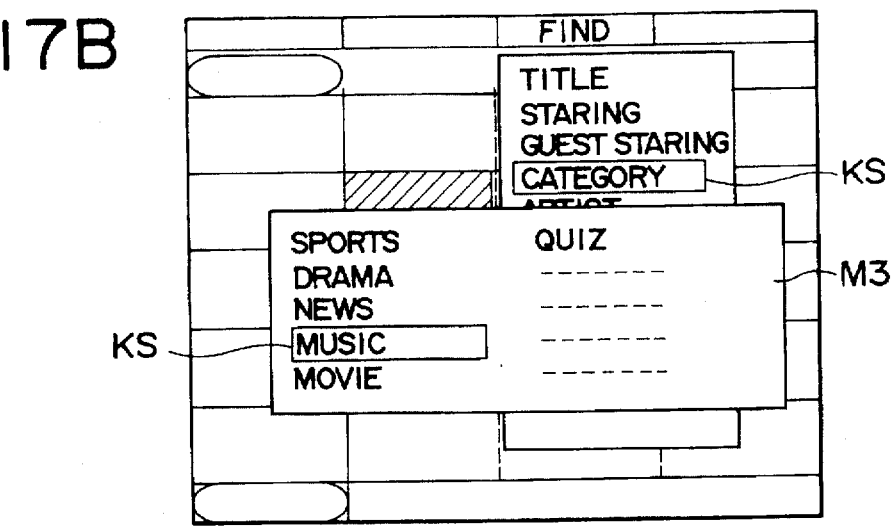
F I G. 17C
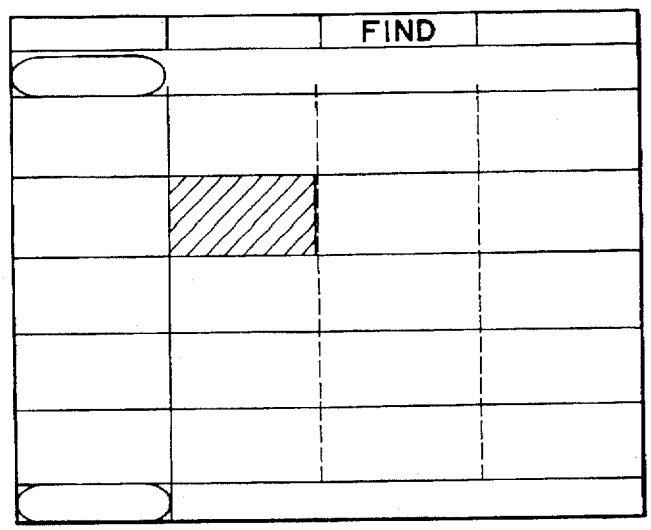

FIG. 18A
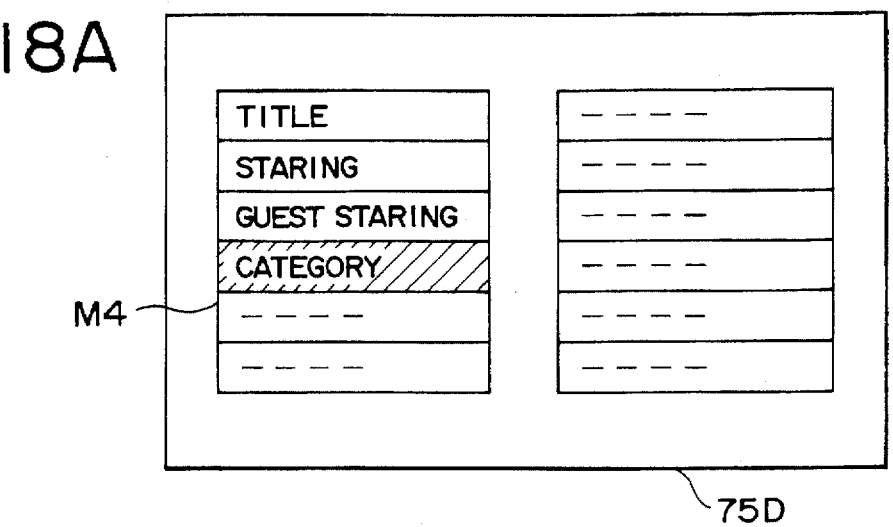
FIG. 18B
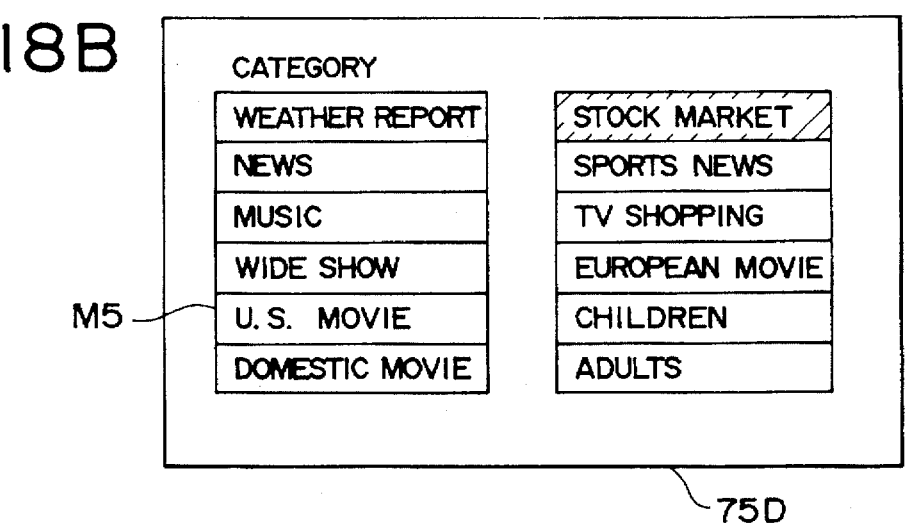
FIG. 18C
| | | |
|---|---|---|
| ○ WALL STREET NEWS | AM04:00. | 12:15 |
| ○ EUROPEAN STOCK | AM04:30. | 03:42 |
| TOUSHOU NEWS | AM07:05. | 30:00 |
| ○ KABUTOCHO NOW | AM07:15. | 24:39 |
| MONEY LINE | AM07:30. | 05:35 |
tbl FIG. 19A
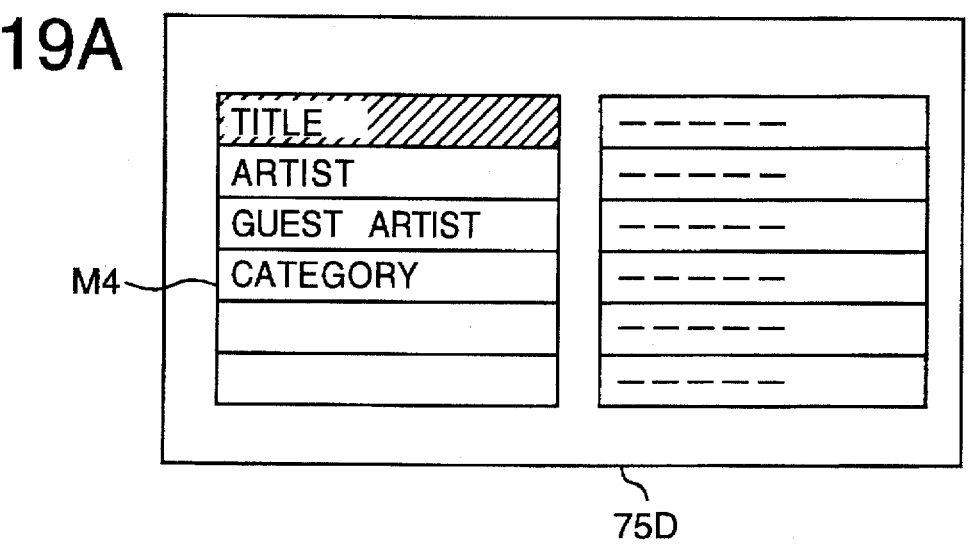
FIG. 19B
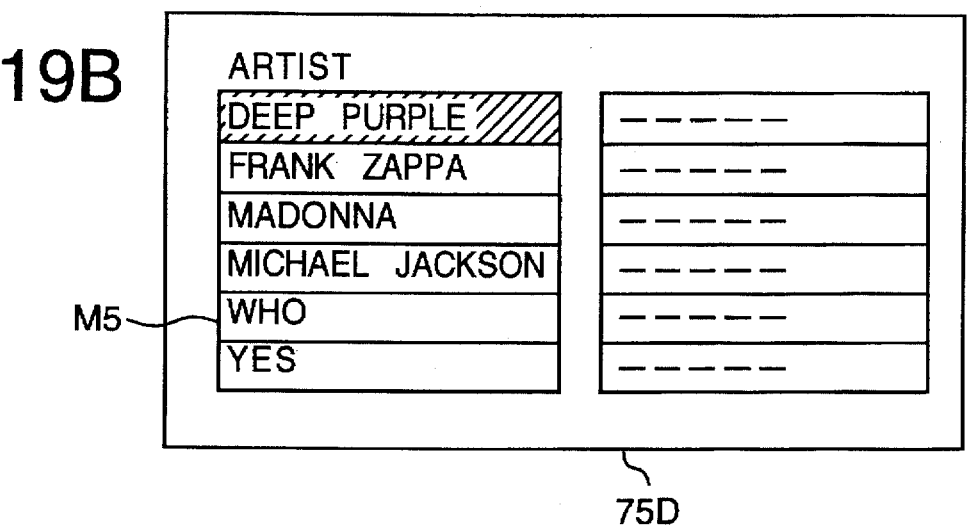
FIG. 19C
| | | |
|---|---|---|
| ○ HIGH WAY STAR | AM05:00. | 03:42 |
| ○ BURN | AM05:04. | 03:02 |
| ○ BLACK NIGHT | AM05:07. | 04:57 |
| ○ CHILD IN TIME | AM05:12. | 10:24 |
| ○ HASH | AM05:22. | 02:54 |
|    FIRE BALL | AM07:56. | 03:46 |

FIG. 22A

```
3. WALL STREET NEWS    AM04:00.  12:15
2. EUROPEAN STOCK      AM04:30.  03:42
1. KABUTOCHO NOW       AM07:15.  24:39
```

```
1. HIGH WAY STAR       03:42
2. BURN                03:02
3. BLACK NIGHT         04:57
4. CHILD IN TIME       10:24
5. HASH                02:54
```

75D

PROGRAM INFORMATION BROADCASTING METHOD PROGRAM INFORMATION DISPLAY METHOD, AND RECEIVING DEVICE

The disclosure of patent application entitled TWO-WAY BROADCAST AND RECEIVING SYSTEM, assigned to Sony Corporation and the inventors being Hitoshi Yoshinobu and Yoshitsugu Hattori is hereby incorporated by reference.

FIELD OF THE INVENTION

The present invention relates to a program information broadcasting system for broadcasting information of the kinds of each of programs to be broadcast and information of elements included in a program such as a performer, a program information display method for receiving the program information broadcast by the broadcasting system and display the same on a display screen, as well as a receiving device such as a television receiver.

BACKGROUND OF THE INVENTION

Usually, when TV audiences view or listen a broadcast program by using a receiving device such as a television receiver or a radio receiver, they recognize the contents of a program to be broadcast and scheduled broadcasting time therefor by reference to a program schedule such as those found in television/radio columns of newspapers or magazines.

Then, when it is desired to reserve a program for reserved sound and video recording (i.e., program a VCR) information such as a broadcasting channel, scheduled broadcasting time and the like of the program to be broadcast which are included in the newspapers or magazines, are inputted and set. Accordingly, when such newspapers or magazines are not available at hand, input operation for program reservation can not be conducted since program schedule to be referred to is not present.

In view of the foregoing situations, it has been practiced, for instance, in a case of television broadcasting to broadcast a program schedule by superposing it on video signals by way of a multiplexed text broadcasting system or the like, so that the program schedule can be displayed on a screen of a television receiver having a multiplexed text recorder. Further, also in a digital satellite broadcasting started in North America (refer, for example, to Journal of "Nikkei Electronics, p 101–110, 1994. 3. 14 (No. 603)", information of a broadcasting schedule is broadcast in a predetermined channel.

It has also been proposed in a transmission method of a high performance teletext for providing information programs including mainly characters, to transmit data as the index for the search of each of programs together with the information for the contents of programs from broadcasting stations (menu tables of programs to be transmitted or key words for the search of programs to be transmitted) ITEJ Technical Report, Vol. 16, No. 71, pp. 1–6, BCS '92-38 (Oct. 1992) and pp. 7–12, BCS '92-38 (Oct, 1992).

However, the menu table in the index search system used for the high performance teletext the transmission method described above, is used only for the search and contains less information such as the program information of television or radio programs.

Further, due to the form in which character information is transmitted, the amount of transmitted data is relatively large. Further, in the multiplexed text broadcasting system or in a system of broadcasting program schedules in a channel separate from that for the broadcasting programs as in a digital satellite broadcasting, the broadcast program schedules are substantially identical with those included in newspapers or magazines and, in addition, data per se for such program schedules are delivered.

Accordingly, the amount of transmitted data is remarkably increased and it is difficult to transmit enough information regarding the detailed contents of broadcasting programs in addition to essential information as the information for program tables such as the name of broadcasting stations, the name of programs and the broadcasting starting time.

Further, even if the information for the program schedules also includes information regarding elements included in each of the programs, for example, information such as for names of singers and music numbers in a case of a musical program, a user has read information on every program when searching the program elements such as names of singers or music numbers and it is extremely troublesome and difficult, for example, to reserve all the programs in which a certain singer appears.

Further, in a case of program reservation such as for reserved video recording, it is necessary to input a broadcasting start time obtained from a program schedule and a presumed broadcasting end time, which makes the program reserving operation troublesome.

Further, in existing program schedules, only the start time for the program to be broadcast is displayed and the broadcasting end time cannot be assumed from the start time for the next program. In addition, since information regarding the broadcasting time on every program element included in each of the programs is not available, it is impossible, for example, to extract and reserve only one to several music numbers in a musical program. Further, it is also impossible in such reserving operations such as recording all the music numbers of a certain singer.

SUMMARY OF THE INVENTION

In view of the foregoing, it is an object of the present invention to provide a program information broadcasting system capable of broadcasting program information in a relatively small capacity of data even if the number of broadcasting stations or the number of programs are increased.

It is a further object of the present invention to provide a program information display method for displaying a program schedule on a display screen by using program information broadcast by the program information broadcasting system according to the present invention.

A still further object of the present invention is to provide a receiving device capable of easily reserving a program by using program schedule data displayed by the program information display method according to the present invention.

The foregoing objects can be attained by a program information broadcasting system according to the present invention, which comprises providing a plurality of classification items each comprising a plurality detailed items for recognizing broadcasting program per se or programs elements included in each of the broadcasting programs, displaying the contents for each of the broadcasting programs with the classification items and the detailed items, forming information for program schedules by displaying these classification items and detailed items by identification data, respectively, to generate scheduled program information and broadcasting the scheduled program information and corresponding table data for the identification data and data for character display of the classification items and the detailed items corresponding to the identification data.

The scheduled program information may contain time information for recognizing the broadcasting start time and the broadcasting end time on every program to be broadcast or on every element unit included in each of the programs to be broadcast.

A program information display method according to the present invention comprises extracting, from received broadcasting wave signals, scheduled program information in which the contents of programs to be broadcast are represented by a plurality of classification items and detailed items on every classification items and the classification items and the detailed items are represented by identification data respectively, and a corresponding table data for the identification data and the data for character display of the classification items and detailed items corresponding to the identification data, replacing the identification data of the extracted scheduled program information with corresponding data for character display by using the extracted corresponding table data, to generate a program schedule data and displaying the program schedule for the character display of the contents of the program to be broadcast on a display based on the program schedule data.

When a classification item or a detailed item is designated by a user, a program having the designated classification item or the detailed items as the program information is extracted from the scheduled program information and the extracted program is display on a display in a state which can be recognized by the user. Alternatively, program schedule data only including the extracted program may be generated and the program schedule based on the program schedule data may be displayed on the display.

A receiving device according to the present invention comprises a program information extraction means for extracting, from received broadcasting wave signals, scheduled program information in which the contents of a program to be broadcast are represented by a plurality of classification items and detailed items on every classification items and the classification items and the detailed items are represented by identification data, respectively, and a corresponding table data for the identification data and data for character display of the classification items and the detailed item corresponding to the identification data; means for generating program schedule data for generating scheduled program data by replacing the identification data for the scheduled program information with corresponding data for character display by using the corresponding table data extracted by the program information extraction means; and a display control means for displaying a program schedule based on the program schedule data generated by the program schedule data generation means on a display screen.

In the receiving device according to the present invention, the program information extraction means has a function of extracting also time information regarding the scheduled broadcasting time for each of programs to be broadcast, the key input means has a key input section for designating a program or program element desired by a user with reference to the program schedule displayed on the display screen and also has a control means for receiving and selecting the program or the program element designated by the key input section at the scheduled broadcasting time for the program or the program element by using the time information regarding the extracted scheduled broadcasting time.

Further, the receiving device according to the present invention incorporates a recording/reproducing device 200, which records information regarding the recorded contents into a recording area (UTOC) separate from the main recording data, and comprises a recording means for recording the received signals for the program or the program element designated by the key input section and received and selected by the control means at the scheduled broadcasting time in a main recording data area of a recording medium by the recording/reproducing device section and recording the information regarding the recorded received signals in a recording area separate from the main recording data area of the recording medium and a reproducing means for reproducing the information regarding the received signals from the recording medium and displaying it on the display screen.

Further, in the receiving device, the key input means has a key input section for a user to optionally select a program or program constituent unit to be reproduced from the recording medium with reference to the information regarding the recorded contents displayed on the display screen and the receiving device has a function of extracting the program or the program element selected by the key input section from the recording medium and reproducing it by the designated sequence.

In the program information broadcasting system according to the present invention, contents for each of broadcasting programs are represented by the combination of a plurality of the classification items and the detailed items for each of the classification items, and the classification items and the detailed items are represented, respectively, by the identification data to form scheduled program information. Then, if the scheduled program information, and the corresponding table data for the identification data and the data for character display of the classification items and the detailed items corresponding to the identification data are applied, the amount of information is reduced as compared with transmitting the data for program table character data. The effect of reducing the amount of information is remarkable, particularly, when the number of broadcasting stations and the number of programs are increased.

Since the amount of information is reduced, the ability to add time information for recognizing the end time for broadcasting program or to broadcast information for the details of programs is substantially enhanced and facilitated.

Since the corresponding table data for the identification data and data for character display of the classification items and the detailed items corresponding to the identification data are always broadcast as the program information, it can easily cope dynamically with decrease, increase or change of the kind of programs or program elements included in the program. For instance, regarding the kind of the program, a correspondence can be established between even identical identification data and news programs in one program information and between the identical identification data and movie programs in another program information.

Since the scheduled program information contain information for recognizing the broadcasting start time and the broadcasting end time for each of programs to be broadcast or on every element included in each of the scheduled broadcasting programs, the broadcasting end time can also be recognized reliably on every program unit, and the broadcasting start time and broadcasting end time can also be recognized on every element unit included in the program.

In the program information display method according to the present invention, the scheduled program data comprising the identification data are reformed into scheduled program data represented by data for character display of the scheduled program data comprising the identification data and display the data on a display. In this instance, when a classification item or detailed item of a program is selectively designated by a user, a scheduled program for only the designated classification item, for example, a sports program is displayed on the display.

Further, when a detailed item for recognizing an element included in a program, for example, a name of a singer is selectively designated by a user, a program schedule regarding programs in which the singer appears is prepared and displayed on a display. The program schedule can display the broadcasting start time and the broadcasting end time or a period of time from the broadcasting start time to the broadcasting end time.

In the program schedule, when a user selectively reserves a desired program or program element with reference to or in the program schedule, the receiving device according to the present invention selectively receives the selected program and the program element from the broadcasting start time to the broadcasting end time.

Then, when the receiving device incorporates a recording/reproducing device section, the selectively received program or program element is recorded in the recording medium. In this case, the data regarding the recorded program or program element are recorded in the recording area separate from the main recording data area. Then, the data recorded in the separate recording area are reproduced and information regarding the main recording data, for example, names of programs and names of singers are displayed on the screen.

Referring to the information regarding the main recording data displayed on the screen, the user can reproduce while changing the reproducing sequence irrespective of the recording sequence or can reproduce by extracting only a portion thereof.

As has been described previously, in the program information broadcasting system according to the present invention, since the kind of the classification items and the detailed items therefor of each of programs represented by ID and included in the scheduled program information and the ID-corresponding list data are broadcast being included in broadcasting signals, the amount of data can be decreased as compared with a case of including all the scheduled program information with direct display data such as text data.

Then, since the ID-corresponding list data are sent together, it is not necessary to determine correspondence between each of ID and the kind of classification items or detailed items therefor, and the program information corresponding to the contents of various programs can be reflected on the scheduled program information case by case for broadcasting. For instance, even if there are a lot of items such as performers or artists and may include new comers, it can be coped with easily by appropriately changing, adding and deleting Id list data for broadcasting.

Further, by using ID including the classification information as a search key and searching the scheduled program information, a program schedule based on the program element as the search key can also be formed easily.

Then, since the scheduled program information contains the information regarding not only the broadcast starting time but also the broadcasting end time, the broadcasting time for each of the program units can be recognized without using such a form of a program table, for example, as indicating the time axis on the abscissa and the channel (broadcasting station) on the ordinate. For example, it is possible to search programs to be broadcast by using a specific program category as a search key, and prepare a program table for displaying programs found as a result of the search, for example, in the earlier sequence of the broadcasting time, together with information regarding the broadcasting start time, the broadcasting end time, the broadcasting end time or the broadcasting time period for each of them.

Further, according to the present invention, it is possible to search programs by using, as a search key, an item as a program element included in each of programs, for example, a performer, and prepare and display a program schedule only consisting of programs in which a certain singer designated by the user appears.

Further, according to the present invention, since the information regarding the broadcasting start time and the broadcasting end time based on the element unit included in each of the programs is also broadcast, a program schedule not on a program unit but on a program element unit can be displayed. Namely, in a music exclusive program, for instance, broadcasting schedule based on each of music numbers can be recognized. Then, since the information for the scheduled broadcasting on every program element units is included in the scheduled program information, it is possible to display also a partial program schedule prepared by extracting, for example, a portion of programs in which a certain singer appears.

Further, the receiving device according to the present invention comprises the recording/reproducing device section and can conduct reserved recording by designating reservation for a program search by the program search. Upon search, since a program can be search by the classification item without knowing the information regarding the broadcasting time, the preserving operation is extremely simple as compared with a case of setting preservation for the broadcasting time of the broadcasting program as in the prior art.

Further, since the contents of the recorded data are recorded to a recording medium such as a disc in an area separate from the main recording data area such as UTOC area in the disc, the reproducing sequence can be made different from the recording sequence by using the information in the separate area. Further, only the desired program can be selected and reproduced among a plurality of recorded programs.

BRIEF DESCRIPTION OF THE DRAWINGS

FIGS. 1A-1C depict broadcasting signals in one embodiment of a program information broadcasting system according to the present invention;

FIG. 3 is a view illustrating a list data for the kind of program classification items broadcast as a portion of the broadcasting signals in the embodiment shown in FIGS. 1A-1C;

FIG. 4 is a view illustrating a ID-corresponding list data broadcast as a portion of the broadcasting signals in the embodiment shown in FIGS. 1A-1C;

FIG. 5 is a view illustrating a ID-corresponding list data broadcast as a portion of the broadcasting signals in the embodiment shown in FIGS. 1A-1C;

FIG. 6 is a view illustrating a ID-corresponding list data broadcast as a portion of the broadcasting signals in the embodiment shown in FIGS. 1A–1C;

FIG. 7 is a view illustrating a ID-corresponding list data broadcast as a portion of the broadcasting signals in the embodiment shown in FIGS. 1A–1C;

FIG. 15 is a view illustrating an example of a program schedule displayed on a display of one embodiment of a receiving device according to the present invention;

FIGS. 17A–17C are views illustrating an example of a display upon program search in one embodiment of a receiving device according to the present invention;

FIGS. 18A–18C are views illustrating an example of a display upon program search in one embodiment of a receiving device according to the present invention;

FIGS. 19A–19C are views illustrating another example of a display upon program search in one embodiment of a receiving device according to the present invention;

FIGS. 22A–22B are views illustrating an example of reproducing information regarding the recorded contents recorded in a recording medium used in a recording/reproducing device section and displaying the information on a display in one embodiment of a receiving device according to the present invention.

DETAILED DESCRIPTION OF THE PREFERRED EMBODIMENTS

Figure 2:
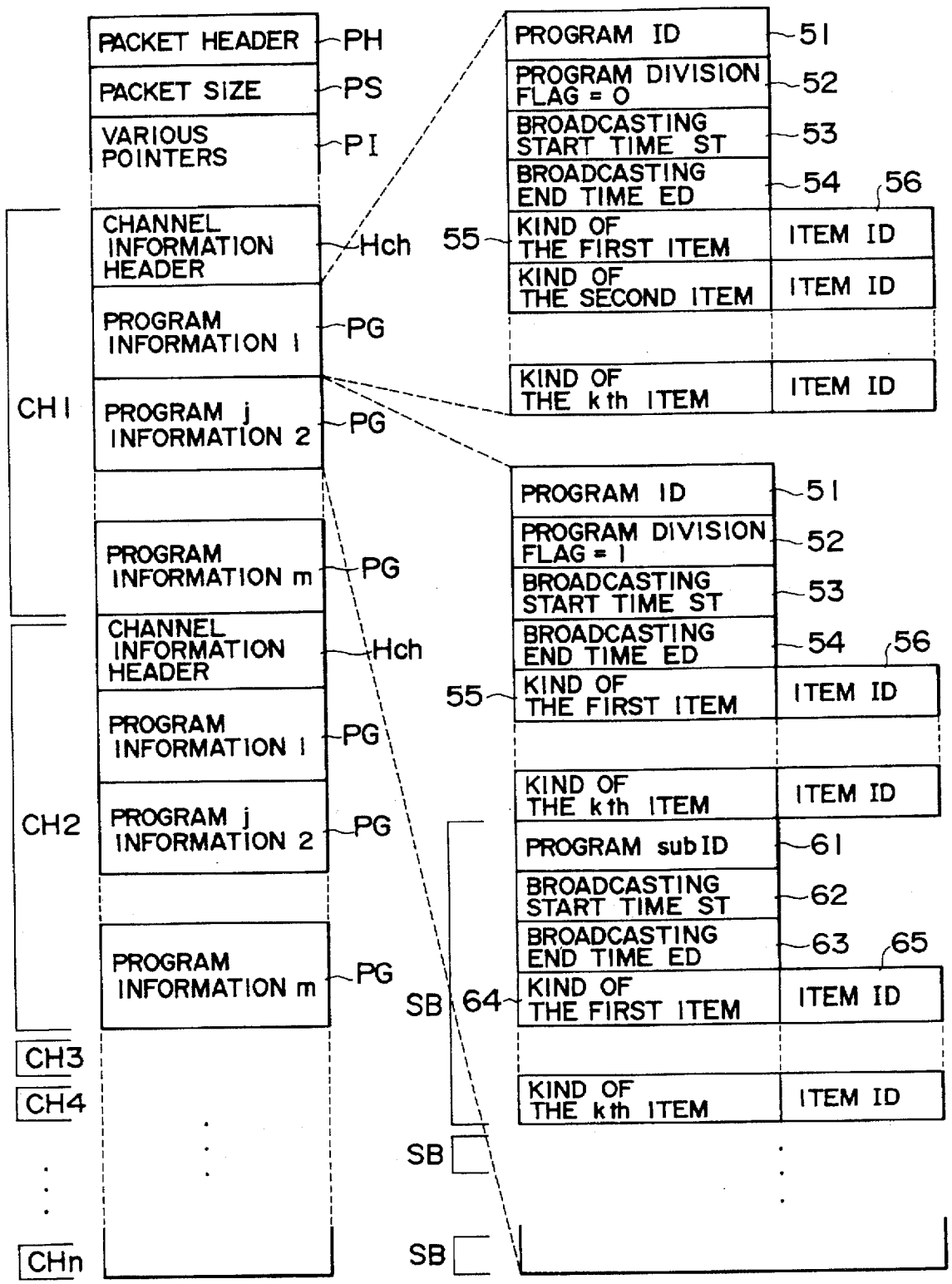
FIG. 2 is a view illustrating an example of program schedule data broadcast as a portion of the broadcasting signals in the embodiment shown in FIGS. 1A-1C.

At first, a preferred embodiment of a program broadcasting information system according to the present invention will be explained.

In this embodiment, the present invention is applied to a digital satellite broadcasting started in the United States. In existent analog ground wave broadcasting, a frequency band is divided, for example, on every 6 MHZ, each of the divided frequency bands being used as a broadcasting channel and a one-to-one correspondence exists between broadcasting stations and broadcasting channels, so that programs from a certain broadcasting station can be selectively received by selecting one broadcasting channel.

On the contrary, in the digital satellite broadcasting in this embodiment, although a concept of the channel (corresponded to a broadcasting station here and hereinafter) is present, the channel does not mean a specific frequency band. This is so arranged for effective utilization of a broadcasting frequency band.

That is, in the digital satellite broadcasting, video images or sounds are broadcast under data compression, for example, by MPEG1 and MPEG2. For a program with less motion in a screen, the amount of information to be broadcast may be small. On the other hand, in a case of video images of violent motion such as in sports programs, a great amount information is necessary for broadcasting with no degradation of picture quality. In view of the above, in a case of broadcasting a certain program, a broadcasting frequency or a group of frequencies used is changed in accordance with the amount of information to be broadcast thereby effectively utilizing the broadcasting frequency band. Namely, in a case if the amount of information is small, a plurality of programs can be broadcast at one frequency or a group of frequencies. On the other hand, where the amount of information is great, a plurality of frequencies or a plurality of frequency groups may be necessary even for one program depending on the case.

In the digital satellite broadcasting, since the situation of using broadcasting waves is not fixed relative to the channel, information indicating how to use other broadcasting frequency or a group of frequencies to the channel is question is broadcast. This is referred to as an index channel in this specification.

FIGS. 1A–1C show an example of data sent as broadcasting signals in which portions surrounded by solid lines represent data packets respectively. Each of the packets has a variable length, and a data packet such as for a channel allocating information required for channel selection as described later is periodically sent such that it is always present once within a predetermined period of time. Further, each of the packets has at the leading part thereof a packet identification data for identifying respective packets.

FIG. 1A shows main broadcasting signals broadcast for one channel at a broadcasting frequency or a group of frequencies. In this example, the main broadcasting signals comprise a video data packet 11, an audio data packet 12, a scheduled program information packet 13, a program appended information packet 14 and other packet 15.

Then, the video data packet 11 comprises dynamic data compressed by a compression form such as MPEG1 or MPEG2. The video data packet 11 is always present by one in every certain period of time. However, the video data packet 11 is not present in a case of a music channel.

The audio data packet 12 comprises audio data compressed in a compression form such as MPEG/Audio. Also the audio data packet 12 is always present by one in every certain period of time.

The scheduled program information packet 13 contains, in this instance, scheduled program information to be broadcast in the channel. The next program appended information packet 14 contains program appended information such as information for program title, broadcasting start time, broadcasting end time being currently broadcast in the channel and, further, information for caption broadcasting.

Then, FIG. 1B shows index data broadcast in the index channel. In this example, the index data contain current time information packet 21, a channel allocated information packet 22, a scheduled program information packet 23, a packet 24 for Id-corresponding list data and other packet 25.

The current information of the current time information packet 21 indicates the current time. However, in the digital broadcasting using a satellite, since the broadcasting range covers broad districts, difference in time may be caused depending on the districts, so that standard time is broadcast as the current time information from the broadcasting station. Then, in this example, a receiving device is set with information indicative of a district in which the receiving device is installed, for example, a zip code.

Then, the receiving device determines the difference in time in the district from the standard time based on the district-indicating information, adds or subtracts the difference in time to and from the received standard time to calculate the current time in that restrict. Then, the receiving device compares the received or calculated current time with the time indicated by an incorporated timer (clock) at a certain cycle, for example, when the power source turns on. If there is any time difference or the time reference exceeds an allowable error, the device calculates the time of the incorporated timer by using the information for the received or calculated current time.

The channel allocated information packet 22 is information which is referred to by the receiving device upon channel selection or switching and this is information indicating the utilization of transmission waves (frequency or group of frequencies) by respective programs at the relevant time.

The scheduled program information packet 23 broadcast as the index channel is the scheduled program information for all the channels. The scheduled program information of the packet 23 comprise scheduled program data containing not only the broadcasting time and the title but also other appended information. As described later, the receiving device prepares a program schedule based on the scheduled program data and selectively displays the same on a screen of the receiving device.

The program schedule data, in this case, do not comprise character data to be displayed as the scheduled program per se, except for the information on the broadcasting time but are prepared as described below on the side of broadcasting.

At first, on the side of broadcasting, classification items each comprising a plurality of detailed items are set and prepared as information for recognizing the broadcasting program per se or program elements included in each of the broadcasting programs. They are in such a relationship that the classification item is a general classification and the detailed item is a sub classification. The classification items and the detailed items are changed in accordance with the contents of the program to be broadcast. Then, the classification items and the detailed items are represented respectively by identification data (hereinafter referred to as ID), and corresponding table data for the identification data and the data for character display of the classification items and the detailed items corresponding to the identification data are provided.

The broadcasting station once expresses the contents of each of programs to be broadcast that constitute the scheduled program information, with the classification items and the detailed items therefor. Then, all the classification items and the detailed items are replaced with data expressed by ID using the corresponding table data. Then, the scheduled program information is reconstituted by each of the ID-expressed program information, which are then broadcast as the scheduled program information packet 23 in the index data.

Further, the corresponding table data for each of ID and the data for character display of the classification items and the detailed items corresponding to the ID are broadcast as the ID-corresponding list data packet 24. The scheduled program information broadcast as the index channel is the scheduled program information for all the channels.

The scheduled program data contain, as the time information, the broadcasting start time and the broadcasting end time for the entire of each of the programs as well as, if the program can be divided into each of program elements included in the same, the broadcasting start time and the broadcasting end time on every program element units. As an example of the dividable program, a music exclusive program can be mentioned for instance. This is because the program exclusive program can be divided into units of music numbers although they constitute, as a whole, a program.

FIG. 2 shows an example of scheduled program data of the scheduled program information packet 23. As shown in FIG. 2, at the leading part of the scheduled program data, a packet header PH containing packet ID indicating that this is the data of the scheduled program information packet 23 is broadcasted. The succeeding packet size PS shows the entire length of the packet 23. Next to the packet size PS, various kinds of pointers PI follow. Then, after the various kinds of pointers P1, a group of program information CH1 for a broadcasting station in a first channel, a group of program information CH2 for a broadcasting station in a second channel, . . . and a group of program information CHn for a broadcasting station in an nth channel are broadcast successively.

Each of the groups of program information CH1–CHn comprises a channel information header Hch, and program information (program information 1–program information m) PG by the number of m (m: optional integer). The channel information header Hch comprises text data, for example, for the name of broadcasting stations such as CNN or ABC and corresponding channel numbers.

Each program information PG comprises information 51 of program ID for identifying the program, a program division flag 52, information 53 for broadcasting start time ST, information 54 for broadcasting end time ED, information 55 of classification items for classifying the program selected from a plurality kinds of classification items previously set and provided as described above (expressed by ID, the information of the classification item will be referred to as the information for the kind of items here and hereinafter) and detailed item 56 expressed with ID for the information 55 of each kind of items (also selected from previously provided kinds as described previously). The information 55 for the kind of items and the detailed item ID 56 therefor are information also as the program element included in the program.

The program division flag 52 comprises 1 bit flag F, in which flag F="0", in a case of a usual program, for example, movie, drama and news containing one program unit within the broadcasting period (from the broadcasting start time to the broadcasting end time), and the program information has no program subinformation SB to be described later as shown in an upper right portion of FIG. 2.

Then, in a case of a program as in a music exclusive program in which the entire portion constitutes a broadcasting program and the program can be divided, for example, by the units of music numbers or singers as described previously, the program division flag F is set as F="1", and the information regarding the divided program unit is included in in the program information PG. The program information PG shown in a lower right portion of FIG. 2 is such an example, which contains a plurality of program subinformation SB.

Each of the program subinformation SB also has a data structure substantially identical with that of main program information items 51–56, and comprises information 61 for the program subID as the identification information for each of the divided sub program units, information 62 for the broadcasting start time ST on the unit of the divided subprogram, information 63 for the broadcasting end time ED on the unit of the divided subprogram, information 64 of a plurality kinds of items for classifying the divided sub program units and detailed item ID to information 64 for each kind of items. Usually, as shown in the example of the figure, the program subinformation SB contains no program division flag but it is of course possible to provide the program division flag also in the subinformation SB, so that the program can be classified more in details.

As the information 55 and 64 for the kind of the items, it is possible to set, for one program or one divided program unit, a plurality kind of items by the optional number of k from the first kind of item to the kth kind of item (k=1, 2, . . . ), but the information for each kind of items does not comprises text data but is expressed by the ID data of the list table for the kind of items transmitted in the packet 24 of the ID-corresponding list table data (list data for the kind of items to be described later).

Further, each of the detailed items ID on every information 55 or 64 for each kind of items is expressed by ID indicated in the ID-corresponding list data for the detailed items on every kind of items to be transmitted in the packet 24 of the ID-corresponding list data (concrete example will be described later).

As information 55 for the kind of items of the main program information, there can be mentioned, for example, a program title, a subtitle, a program category, a main performer, an assistant performer, a guest star, a performer, an artist, etc. Further, as an example of the information 64 for the kind of items of the program subinformation SB, there can be mentioned in addition to the examples described above, for example, a performer (name of a singer), a name of music number, and a name of relevant record company, for instance, in a case of the music program.

Usually, at least one kind of items of the program sub information SB is identical with one of the kind of item 55 of the main program information, which serves as a link when the kind of item of the program subinformation SB is sought from the kind of item of the main program information.

The ID-corresponding list data 24, in this example, comprises, as shown in FIG. 1C, a data for a plurality kind of items, and ID list data corresponding to each of plurality kind of detailed items. Namely, the leading part is at first defined as the header information 31 containing identification information indicating that the packet is the ID-corresponding list data 24. After the header information 31, follows the list data 32 for various kinds of classification items in the scheduled program information under broadcasting as the index data and, further, ID-corresponding list data 33–36 follow thereafter.

In the example of FIG. 1C, the list data 33 is the ID list data corresponding to the program title, the list data 34 is the ID list data corresponding to the program subtitle, the list data 35 is ID list data corresponding to the performer and the list data 36 is the ID list data corresponding to the program category. In addition, other necessary ID-corresponding list data, such as list data corresponding to the music number ID and the list data corresponding to the license ID corresponding to the relevant recording company are set and broadcast by the broadcasting station in accordance with the program to be broadcast.

FIGS. 3–8 show examples of each of list data 32–36, each of which comprises table header Htb, size information SZ showing the size of the table, ID information 37, and text data 38 as an example of data for character display. The ID information 37 and the text data 38 are information corresponding to reference.

The ID information 37 in this example is expressed by four digit hexadecimal codes. As shown in the figure, the text data 38 is a character code data whose size is variable. For this purpose, an end code (expressed by n in the figure) is always inserted at the last of the text data 38. Further, "FFFF" is inserted, for example, as a table stopper (information showing the last of the table) at the last of each of the ID corresponding list data.

FIG. 3 is an example of the list data for the kind of items, which is a data of a corresponding table between text data 38, for example, "TITLE", "SUBTITLE" and "CATEGORY" and ID 37 corresponding thereto. One of the corresponding ID 37 of the list data for the kind of items is described in each of information 55 or 64 for the 1st to kth kind of items of the program information PG or the program subinformation SB in FIG. 2.

FIG. 4 shows the ID corresponding list data for the kind of item "TITLE", in which the table header Htb is represented by ID (=0000) of the text data "TITLE" of the list data for the kind of items in FIG. 3. Then, the text data 38 for the detailed item on the kind of item "TITLE", for example, the text data of "Today's News", "Coast to Coast" and "Mr. Postman" and the ID 37b corresponding thereto are expressed in a table form, to constitute the list data corresponding to the title ID.

In the information 55 or 64 for the 1st to nth kind of items of the program information PG or program sub information SB in FIG. 2, the item ID to the right of the kind of item as "TITLE" is expressed by one of the corresponding items 37 in FIG. 4. The relationship described above between the information of the kind of items for the program information PG and the program subinformation SB and the item ID is similar also for other kinds of items.

Figure 8:
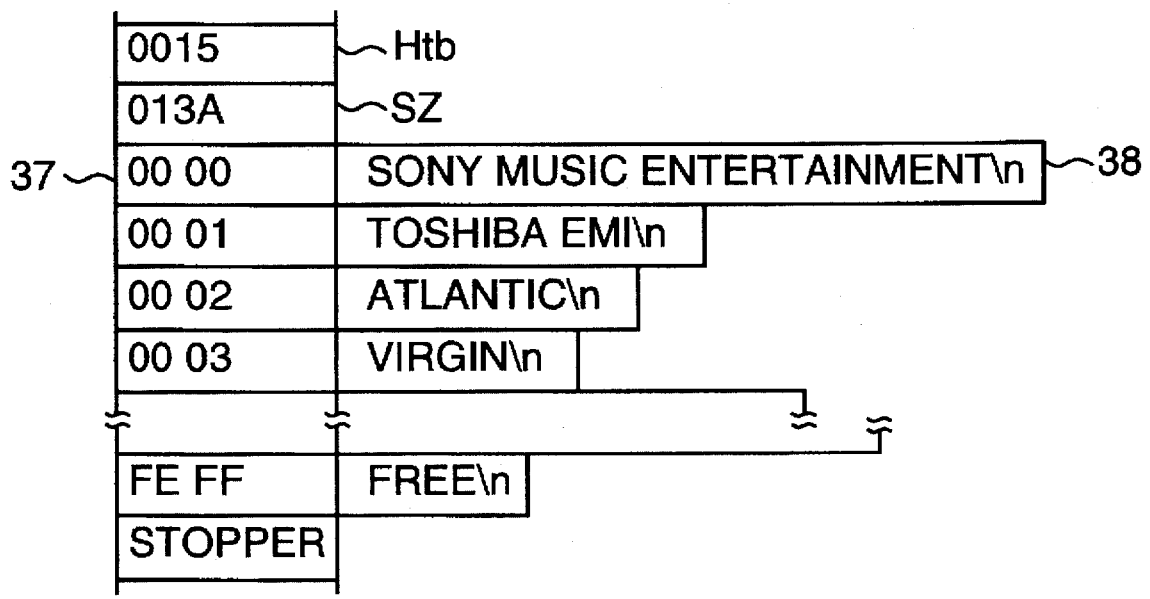
FIG. 8 is a view illustrating a ID-corresponding list data broadcast as a portion of the broadcasting signals in the embodiment shown in FIGS. 1A–1C.

FIG. 5 is the ID corresponding list data for the kind of item "SUB TITLE", FIG. 6 is the ID corresponding list data for the kind of item "PERFORMER", FIG. 7 is the ID corresponding list data for the kind of item "PROGRAM CATEGORY" and FIG. 8 is the ID corresponding list data for the kind of item "LICENSE".

In a case of an example of the list data corresponding to the program category ID shown in FIG. 7, upper two digits in the four digits ID code represent common name such as "NEWS" and "MOVIE", which belongs to a general classification of the category. Then, the lower two digits in the ID code constitute a sub classification to the category of the general classification. Specifically, if the general classification is a category "News" for instance, the latter is defined, for example, as "Political News" and "Sports News".

In the scheduled program data in FIG. 2, the broadcasting end time itself is broadcast as the information for recognizing the broadcasting end time but a broadcasting period of time from the broadcasting start time may be cast as the information for recognizing the broadcasting end time.

In the program information display method according to the present invention, a program table to be broadcast (program schedule) is prepared and displayed on a display screen by receiving the foregoing broadcasting signals and using the data of the scheduled program information packet 23 constituted with the ID code and the broadcasting time information and the ID corresponding list data of the packet 24 that are broadcast as the index data.

The receiving device according to the present invention practices the program information display method as described above by receiving broadcasting signals, preparing a program schedule and displaying it on a display screen, and conducting program search or reservation recording (video recording or sound recording) intended to be viewed or listened by a TV audience using the kind of items and detailed items therefor as the search data.

Figure 9:
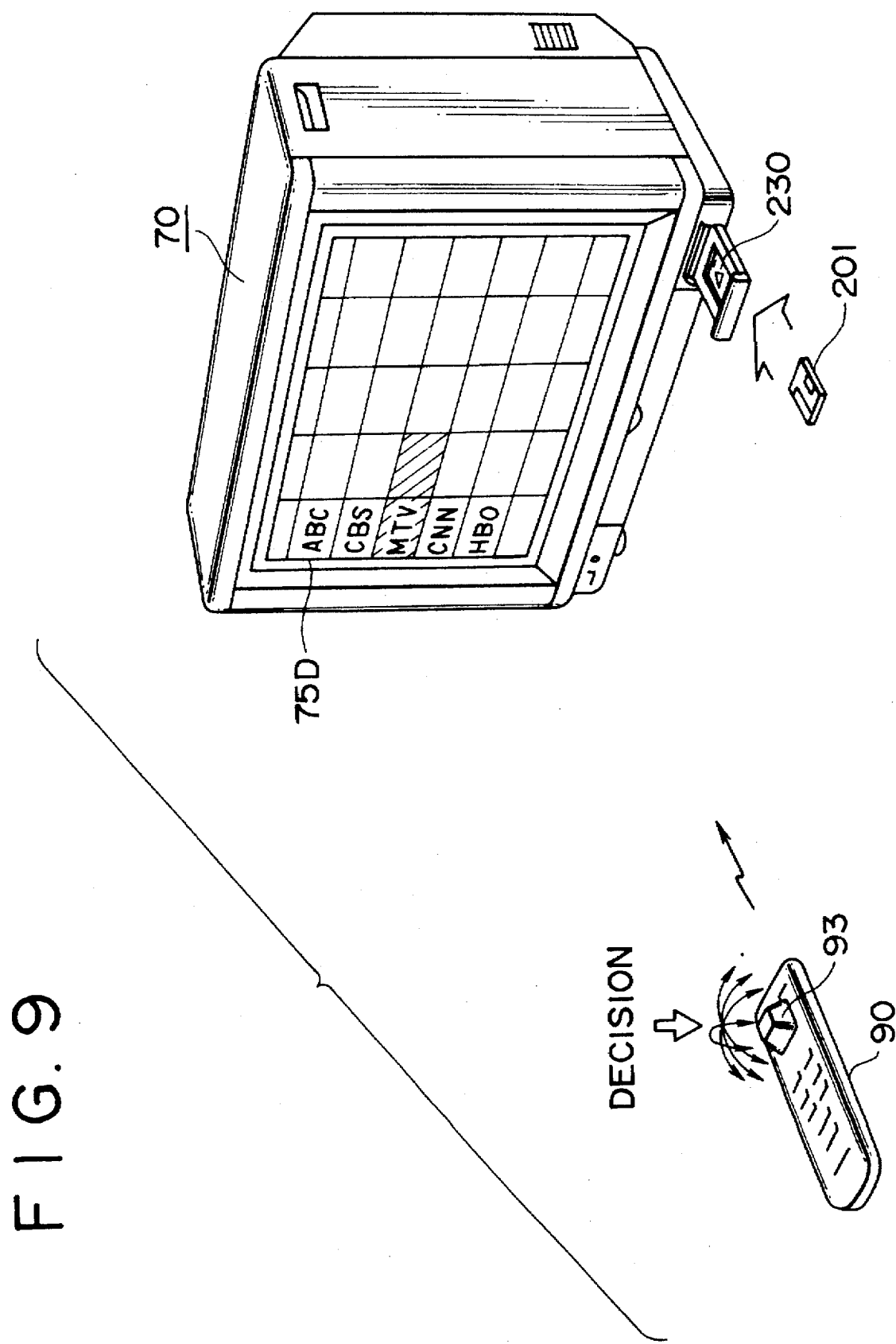
FIG. 9 is a view for explaining an appearance of an embodiment of a receiving device according to the present invention.

Description will be made to one embodiment of a receiving device according to the present invention for practicing the program information display method in accordance with the present invention with reference to FIG. 9.

Digital broadcasting waves may be transmitted not only by way of a satellite but also by using optical cables, but an embodiment to be described below is an example of a receiving device for receiving digital broadcasting waves using the satellite. FIG. 9 is an outer view of a receiving device 70 in this embodiment and a remote commander 90 used for the receiving device 70. The receiving device 70 in this embodiment incorporates a recording/reproducing device section. The recording/reproducing device section uses, in this embodiment, a so-called mini-disc as an example of an opto-magnetic disc capable of over writing as a recording/reproducing medium. The receiving device 70 has a disc loading portion 230 at a lower right corner of a screen 75D thereof, which slides forward-to-backward direction thereby entering or ejecting a disc into and out of the device, and a mini-disc 201 is loaded or unloaded to and from the loading section 230.

Figure 10:
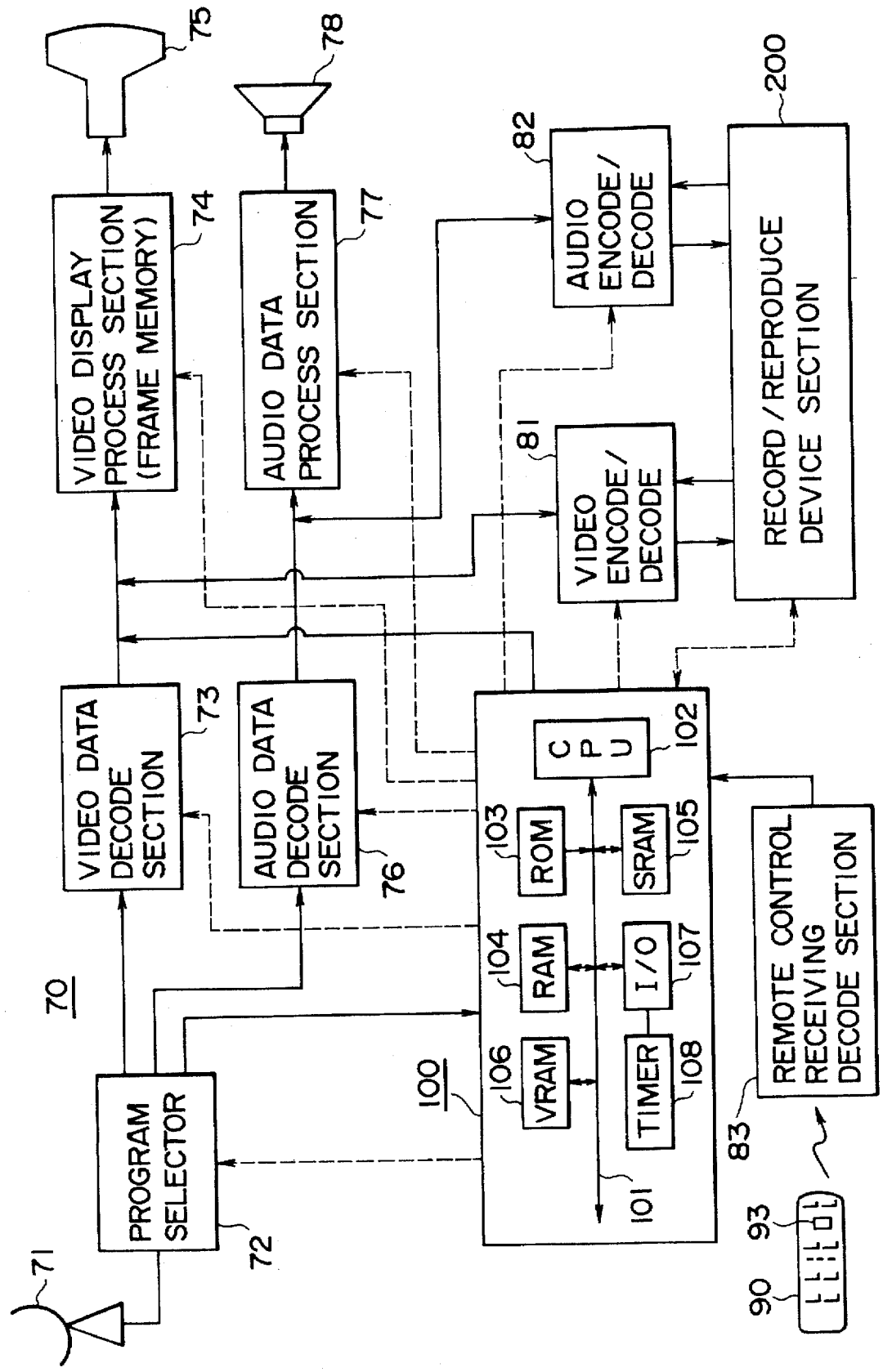
FIG. 10 is a block diagram for an embodiment of a receiving device according to the present invention.

FIG. 10 shows an example of a block diagram of the receiving device in this embodiment. A satellite broadcasting antenna 71 receives digital broadcasting waves having the data constitution as shown in FIG. 1 and they are supplied to a program selector 72. The program selector 72 receives a control signal from a system control section 100 as described later, conducts a so-called channel selection to extract the index data from the broad casting signals, as well as extract a image data packet and an audio data packet of a channel designated by a user.

The video data compressed by an MPEG1 or MPEG2 system and extracted by the program selector 72 are supplied to a video data decode section 73 in which decoding, data expansion and interpolation are applied. The video data decode section 74 outputs video data in the form of frame images to a video display processing section 74. The video image processing section 74 writes the frame images at a prescribed period to a frame memory incorporated in the processing section 74 and outputs them to a display, in this embodiment, a CRT display 75. Thus, the video images of a program selectively designated by the user are reproduced and displayed on the screen of the CRT display 75.

On the other hand, the audio data compressed in the form of MPEG/Audio and extracted from the program selector 72 are supplied to an audio data decode section 76 in which decoding, data expansion and like other processing are applied and then they are outputted in the form of digital signals or analog signals, supplied by way of an audio output processing section 77 to a loud speaker 78 to reproduce sounds of the program. The audio output processing section 77 conducts volume control, tone control or the like by receiving a control signal from the system control section 100 in accordance with a volume controlling operation and tone controlling operation of the user applied by way of the remote commander 90. In a case where the audio signals are outputted in the form of digital signals from the audio data decode section 76, D/A conversion is also applied.

The system control section 100 includes a microcomputer, in which a CPU 102, a ROM 103 containing fixed data such as image data and character font data for displaying a program to be executed and program tables, a RAM 104 as a volatile memory used for a work area or the like, a SRAM 105 as a non-volatile memory for data requiring holding, a video RAM 106 and a timer (clock) 108 by way of a port 107 are connected to a system bus 101.

Further, when the user conducts operation to the remote commander 90, the remote commander sends a remote control signal for example, as infrared rays in accordance with the user's operation, to a remote control receiving/decode section 83. The remote control receiving/decode section 83 decodes the received remote control signal and inputs it to the system control section 100 by way of I/O port (not illustrated). The system control section 100 translates the inputted digital remote control signal and executes the program in the ROM 103 so as to conduct control in accordance with the user's remote control operation.

When channel selection operation (program selection operation) is conducted to the remote commander 90, the video data packet, the audio data packet and the like of the channel are extracted.

Upon extraction of the data packet, the system control section 100 receives index data of the index channel from the program selector 72 and recognizes the frequency or the group of frequencies to which the channel selected by the user by the remote commander 90 is allocated. Then, the system control section 100 sends a selection control signal depending on the result of the recognition to the program selector 72, and the program selector 72 controls so as to select, for example, the video data packet and the audio data packet of the channel designated by the user.

As the allocated information for the frequency or the group of frequencies to the channel, since the information changed successively in accordance with the current broadcasting wave by the index channel is broadcast at a predetermined period as the channel allocated information packet 22 as described previously, the system control section 100 requests, in this embodiment, the program selector 72 for the demand of the data packet of the index data at a predetermined period as described previously. Upon receipt of the demand from the system control section 100, the program selector 72 returns the data packet of the index channel to the system control section 100. Thus, the system control section 100 can always monitor the allocation of the frequency or the group frequencies to the channel.

In the same manner, the system control section 100 requests the program selector 72 for the transfer of the current time information 21, the scheduled program information packet 23 and the ID corresponding table data 24 of the index channel, for example, at a predetermined period. Upon request, the program selector 72 transfers the requested data packet to the system control section 100.

Instead of sending the request for obtaining the data packet of the index data from the system control section 100 to the program selector 72 at a predetermined period, it may be previously set such that the program selector 72 informs (transfers) the information packet such as of the data packets 21–24 of the index channel, if they are found, to the system control section 100, or the program selector 72 may inform the designated data packet found so far to the system control section 102 at a predetermined period irrespective of the request from the system control section 100.

Then, the receiving device 70 in this embodiment has a recording/reproducing device section 200 as shown in FIG. 10. The recording/reproducing device section 200 includes a so-called minidisc which is an opto-magnetic disc capable of recording and reproducing as described above.

When a recording demand operation is conducted by way of the remote commander 90 to the recording/reproducing device section 200, the system control section 100 sends video data from the video data decode section 73 to a video encode/decode section 81 and also sends audio data from the audio data decode section 76 to an audio encode/decode section 82.

The video encode/decode section 81 encodes the video data from the video data decode section 73 into a form to be recorded to the recording/reproducing device section 200. In this embodiment, it is encoded, for instance, in the data form of MPEG1 in order to record in the opto-magnetic disc described above.

Further, the audio encode/decode section 82 encodes the audio data from the audio data decode section 76 into data in the form to be recorded in the mini-disc. Namely, it divides the audio data into a plurality of bands such that the band width is widened for the higher area, form blocks each comprising a plurality of samples (number of sample preferably equal between each of the bands) on every divided bands, applies orthogonal conversion on every block for each of the bands to obtain coefficient data and conducts bit allocation on every blocks based on the coefficient data. The data compression system in this case considers the human auditory sense characteristics to sounds and can compress the data at high efficiency (refer to European Patent Laid-Open No. 0426034). For instance, the voice data is compressed to about ⅕.

When the recording/reproducing device section 200 is put to a reproducing mode, the video encode/decode section 81 and the audio encode/decode section 82 receive the reproduced video image data and the reproduced audio data from the recording/reproducing device section respectively, decode them, display the decoded reproduced image data by way of the video display processing section 74 on the CRT display 75, while reproduce the decoded reproduced audio data by way of the audio processing section 77 to reproduce sound from the loud speaker 78.

Figure 11:
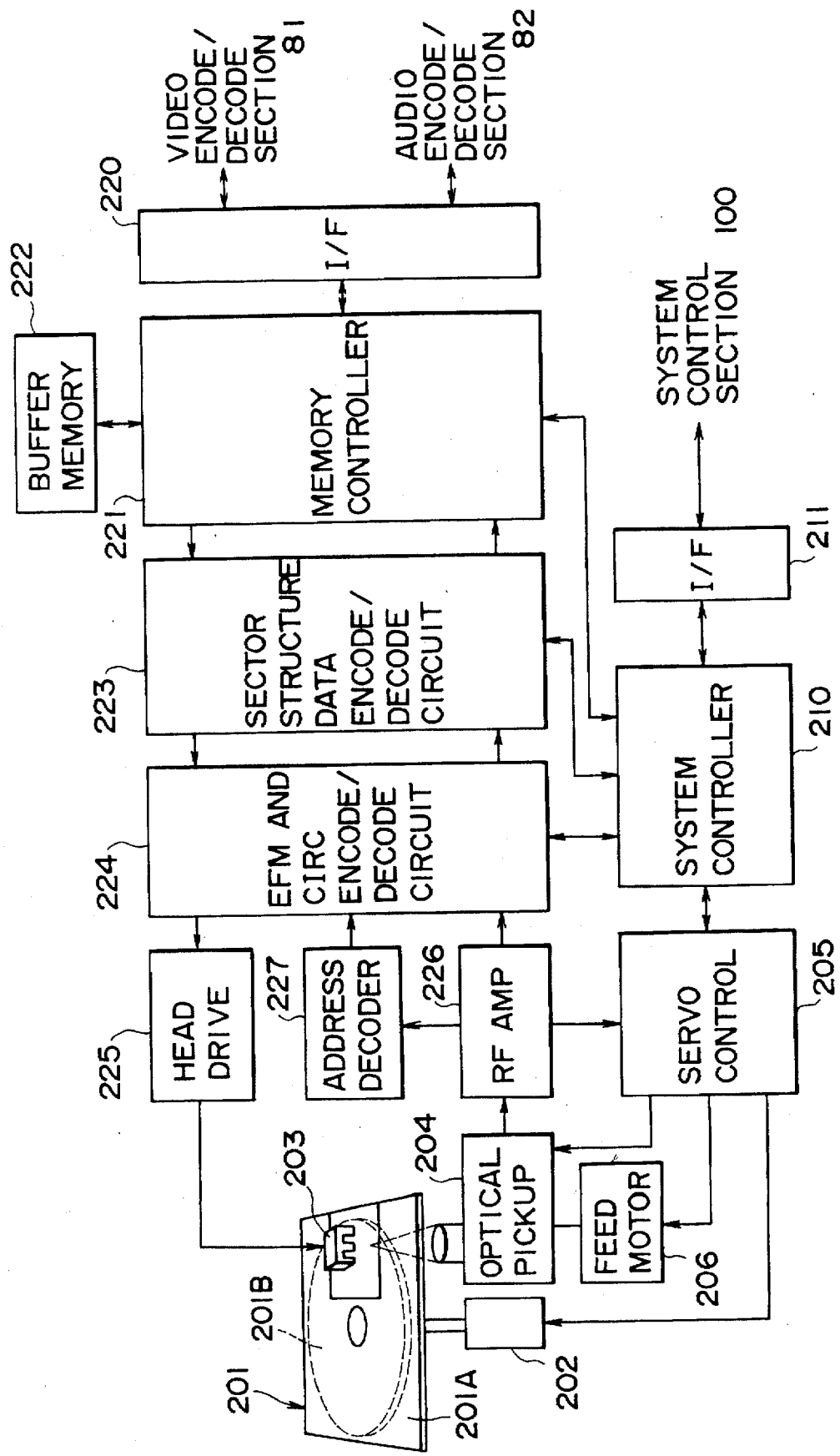
FIG. 11 is a block diagram for an example of a recording/reproducing device section incorporated in one embodiment of a receiving device according to the present invention.

FIG. 11 shows an embodiment of the recording/reproducing device section 200.

In FIG. 11, reference numeral 201 denotes an opto-magnetic disc (mini-disc). The mini-disc 201 in this embodiment comprises a disc 201B of 64 mm diameter included in in a cartridge 201A for preventing dusts and injuries. The disc 201B is previously formed with pre-grooves for optical spot control (tracking control) and, particularly, in this embodiment, absolute address data is recorded in the pre-grooves being superposed on a wobbling signal for tracking use.

The disc 201 is rotated by a spindle motor 202. The rotation of the spindle motor 202 is controlled by a servo control circuit 205 such that the disc 201B is rotated at a constant linear speed. A shutter is provided to the disc cartridge 201A and the shutter is opened when the disc cartridge 201A is placed on a disc loading tray and loaded to the device. Then, a magnetic head 203 for recording is opposed to an upper portion of the device, while a light pickup 204 is opposed below the shutter opening of the disc 201B.

The light pickup 204 is moved and controlled radially of the disc 201B by a feed motor 206. Further, focus and tracking control of the light pick-up 204 is conducted by the servo control circuit 205.

The system controller 210 incorporated in the recording/reproducing device section has a microcomputer loaded therein and conducts communication for the control data or the UTOC data to be described later with respect to the system controller section 100 by way of a communication interface 211 to control the operation of the entire device 200.

The recording/reproducing device section 200 in the embodiment of FIG. 11 is constituted as simple as possible by introducing IC constitution. Each of the sections is put to mode switching between recording and reproduction by a mode switching signal from the system controller.

Signal systems for the video encode/decode section 81, the voice encode/decode section 82 and the recording/reproducing device section 200 are connected by way of an interface 220 to fetch recording/reproducing signals therebetween.

The recording data inputted by way of the interface 220 are once stored by way of a memory controller 221 to a buffer memory 222 controlled by a memory controller 221. In this embodiment, DRAM having 1M to 4M bit data capacity is used for the buffer memory 222.

Unless track jumping for jumping the recording position on the disc 201B is caused due to vibrations, etc, during recording, the memory controller 221 reads out the compressed data from the buffer memory 222 successively at a transfer speed about 5 times as high as the writing speed and transfers the read out data to a data encode/decode circuit 223 of a sector structure.

Further, when occurrence of the track jumping is detected during recording, the memory controller 221 stops the data transfer to the data encode/decode circuit 223, and stores the compressed data from the interface 220 in the buffer memory 220. Then, when the recording position is amended, it conducts control for starting the data transfer from the buffer memory 222 to the data encode/decode circuit 223.

Whether the track jumping is caused or not can be detected, for example, by disposing a vibration gage to the device and determines whether the vibrations are of such magnitude as causing the track jumping or not. Further, in the disc 201B of this embodiment, since the absolute address data is recorded in the pre-grooves as described previously, the absolute address data may be read during recording to detect the track jumping depending on the decoded output therefrom. Further, the outputs from the vibration gage and the absolute address data may be put to ORing operation to detect the track jumping. If track jumping should occur, the power of the laser beam for the opto-magnetic recording is lowered or reduced to zero.

Then, the recording position upon occurrence of the track jumping can be amended by using the absolute address data. Further, the buffer memory 222 needs at least such a data capacity as capable of accumulating compressed data corresponding to the time from the occurrence of the tracking jumping to correct amendment for the recording position as can be recognized from the foregoing in this case. In this embodiment, the capacity of the buffer memory 222 is selected such that it has 1M–4M bits of capacity as described above so as to have a margin enough to satisfy the foregoing conditions.

Also, in this case, the memory controller 221 conducts memory control so as to reduce the data stored in the buffer memory 222 as less as possible in the normal operation during this recording. Namely, it conducts memory control such that if the amount of data in the buffer memory 222 exceeds a predetermined amount, a predetermined amount of data, for example, 32 sectors (1 sector for 1 CD-ROM sector (about 2K bytes)) is read out from the buffer memory 222 to always ensure a writing space of more than a predetermined amount of data.

A data encode/decode circuit 223 encodes the compressed data transferred from the buffer memory 222 into data of a CD-ROM sector structure. Data of 36 sectors containing 32 sector data will hereinafter be referred to as a cluster. As will be described later, recording/reproducing is conducted by the unit of the cluster.

The output data from the data encode/decode circuit 223 is supplied to an EFM and EIRC encode/decode circuit 224. The circuit 224 applies error detecting and correcting coding to the data and applies a modulation processing suitable to recording, e.g., EFM (8–14 modulation) processing in this case. In this embodiment, ACIRC (Add on Interleave+CIRC) in which interleave is changed relative to CIRC (Cross Interleave Read Solomon Code) of CD is used as the code for error detection and correction.

The recording data are intermittent data and four sectors in total for cluster connection (hereinafter referred to as linking sector) are added before and after the 32 sector data to form recording data of 1 cluster comprising 36 sectors. The circuit 223 and the circuit 224 can be constituted as one identical IC.

The recording data thus formed are supplied by way of a head driving circuit 225 to the recording magnetic head 203. This applies a magnetic field modulated by the recording data to the disc 201B (opto-magnetic disc). Further, a laser beam from the light pickup 204 is irradiated to the disc 201B.

The light pickup 204 comprises, for example, a laser light source such as a laser diode, optical parts such as a collimator lens, an objective lens, a deflection beam splitter and a cylindrical lens, and a photo-detector. Upon recording, a laser beam which is constant and greater in the power than that upon reproduction is irradiated to the recording track. The data is recorded on the disc 201B by thermo-magnetic recording by the light irradiation and a modifying magnetic field by the magnetic head 203. The magnetic head 203 and the light pick-up 204 are constituted such that they can move in synchronization in the radial direction of the disc 201.

Further, during recording, the output from the light pick-up 204 is supplied by way of an RF amplifier 226 to an address decoder 227 and the absolute address data wobble-recorded in the pre-grooves disposed along the tracks of the disc 201B is extracted and decoded. Then, the detected absolute address data is supplied to the FEM and CIRC encode/decode circuit 224, inserted to the recorded data and recorded in the disc. Further, the absolute address data is supplied to the system control circuit 210 and used for recognizing the recording position and position control.

Further, a signal from the RF amplifier 226 is supplied to the servo control circuit 205 and a control signal is formed from a signal from the pre-grooves of the disc 201B for constant servo of the linear speed of the spindle motor 202, to speed control the spindle motor 202.

Figure 12:
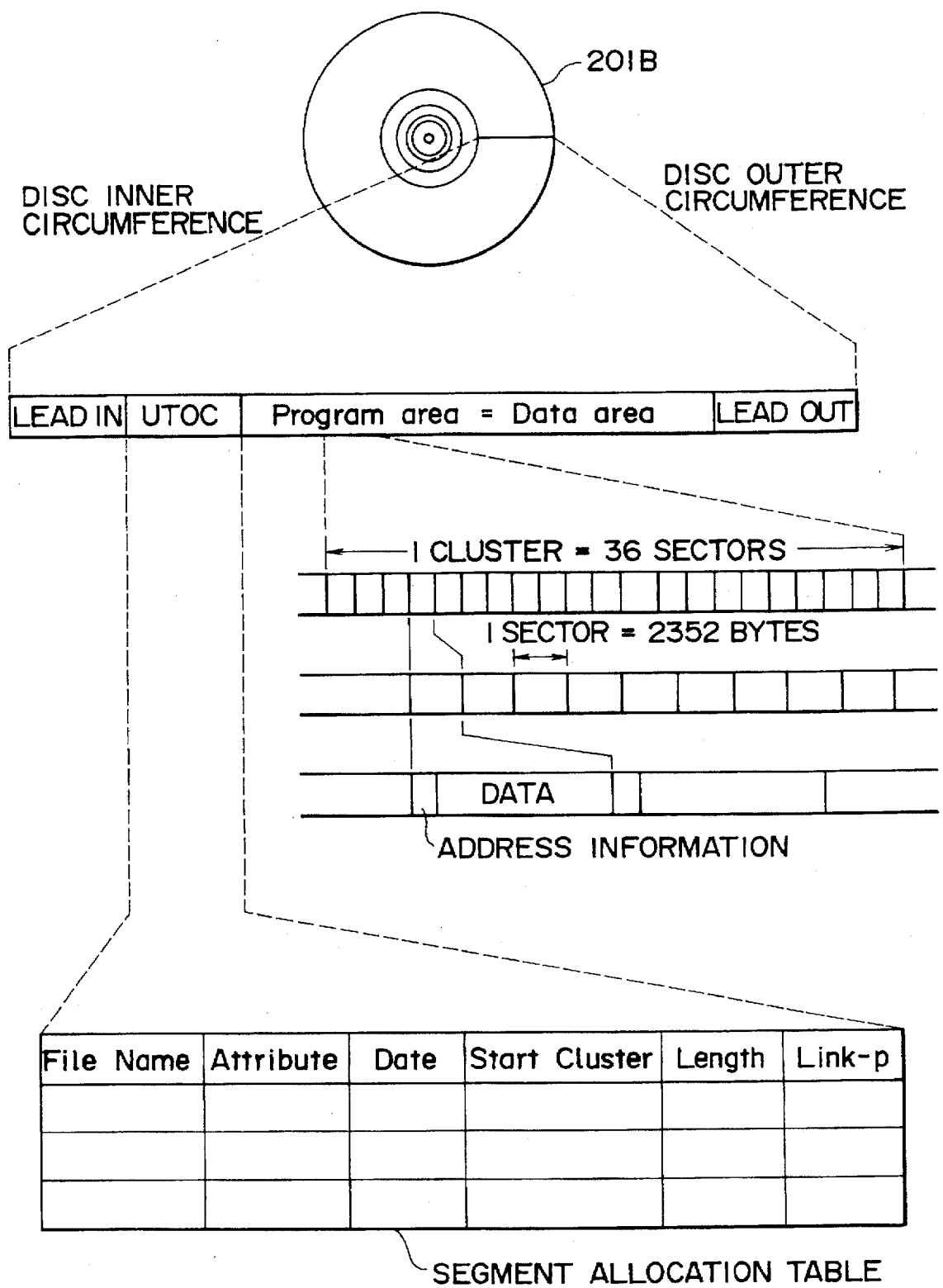
FIG. 12 is a view for explaining recording data in a disc recorded/reproduced in the recording/reproducing device section incorporated in one embodiment of a receiving device according to the present invention.

FIG. 12 shows a recorded format on the disc 201B. Namely, the innermost circumference of the disc 201B is defined as a read-in area, which is followed by UTOC (User Table Of Contents) capable of being written by an user for the contents of the recorded data. A data area follows UTOC and the outermost circumference of the disc 201 is defined as a read-out area.

In UTOC, a segment allocation table information for storing the state of using a group of clusters of the data region on the disc 201 is recorded, so as to control the data file recorded in the disc 201.

In the segment allocation table, an entry is disposed on each of files and, as shown in FIG. 12, there are recorded for each of the entries, "File Name" indicative the appellation of each of files, "Attribute" indicative the attribute for each of the files, "Date" indicative of recording date for each of the files, "Start Cluster" indicative of a cluster at the top in which each of the files is recorded, "Cluster Length" indicative of the data size for each of the files and "Link Pointer" indicative of the entry of the succeeding cluster in case if the file is not recorded in continuous clusters, respectively.

Since files recorded in the disc 201 include files continuous in view of time, that is, files requiring real time processing and files not continuous in view of time and requiring no real time processing, the attribute information contains a flag (1 bit) for distinguishing them. For instance, if the flag is "1", it indicates that the corresponding file continues in view of time, whereas flag="0" indicates that the corresponding file is not continuous in view of time.

Depending on the attribute flag, data are controlled continuously such that the data are not disconnected by a method such as interrupt processing in a case of a file which is continuous in view of time, or controlled such that access to the opto-magnetic disc 201B is completed by reading/writing for once in a case of a file which is not continuous in view of time.

Explanation will then be made to reproduction. Upon reproduction, in the same manner as recording, the spindle motor 202 and thus the disc 201B are put to rotational speed control at a constant linear speed equal with that upon recording by the signal from the pre-grooves, by the servo control circuit 205.

During reproduction, the light pickup 204 detects reflection light of the laser beam irradiated to the aimed track thereby detecting a focus error, for example, by an astigmatism method, and a tracking error, for example, by a push-pull method, and a difference of polarization angle (Kerr rotational angle) of the reflection light from the aimed track, is detected to output regenerated an RF signal.

The output from the light pickup 204 is supplied to the RF amplifier 226. The RF amplifier 226 extracts focus error signal and tracking error signal from the output of the light pickup 204, supplying them to the servo control circuit 205, and binaries reproduced signals to supply them to the FEM and CIRC encode/decode circuit 224.

The servo control circuit 205 conducts focus control for the optical system of the light pickup 204 so as to reduce the focus error signal to zero, and conducts tracking control for the optical system of the light pickup 200 so as to reduce the tracking error signal to zero.

Further, the output from the RF amplifier 226 is supplied to the address decoder 227 in which the absolute address data from the pre-grooves is extracted and decoded. Then, the absolute address data from the decoder 227 is supplied by way of the FEM and CIRC encode/decode circuit 224 to the system control circuit 210, and used for the control of the reproducing position in the radial direction of the disc. Further, in the system control circuit 210, the address information on the sector unit extracted from the reproduced data can also be used for controlling the position on the recording track being scanned by the light pickup 204.

During reproduction, as described later, the compressed data read out from the disc 201B is written into the buffer memory 222, read out and then expanded. Due to the difference in the transmission data between both of the data, reading of the data from the disc memory 201B by the light pickup 204 is conducted intermittently, for example, such that the data accumulated in the buffer memory 222 is not less than the predetermined amount.

In the FEM and CIRC encode/decode circuit 224, the signal supplied by way of the RF amplifier 226 is FEM demodulated and put to error correction processing. The output from the FEM and CIRC encode/decode circuit 224 is supplied to the data encode/decode circuit 223 of a sector structure to solve the sector structure of the mini-disc and decode the data into the original data under the compressed state.

The output from the data encode/decode circuit 223 is once stored by way of the memory control 221 into the buffer memory 222. Then, unless track jumping in which the reproducing position is jumped due to vibrations or the like during reproduction is caused during reproduction, the memory controller 221 successively reads out the data in the compressed state from the circuit 223 at a transfer rate about ⅕ times of the writing rate and then transfers the read out data by way of the interface 220 to the video encode/decode section 81 and/or audio encode/decode section 82.

In this case, the memory controller 221 conducts memory control such that minimum required data is accumulated as possible in the buffer memory 222 during normal operation. For instance memory control is conducted such that when the amount of the data in the buffer memory 222 is reduced to less than the predetermined amount, data is intermittently taken from the disc 201B by the light pick-up 204, and data is written from the data encode/decode circuit 223 so as to always ensure a space for more than a predetermined amount of data.

As has been described above, the video data reproduced by the recording/reproducing device section 200 and supplied to the video encode/decode section 81 is applied with decoding, expansion and interpolation corresponding to the MPEG1 system which is then supplied by way of the video display processing section 74 to the CRT display 75 to reproduce images on the screen.

Further, the audio data reproduced in the recording/reproducing device section 200 is put to processing such as decoding and data expansion in the audio encode/decode section 82 and then supplied by way of the audio processing section 77 to the loud speaker 78 and then outputted as a sound.

The Display of Program Schedule, Program Search and Program Reservation in the Receiving Device will now be described.

In the receiving device described above, channel selection and mode switching of the recording/reproducing device section 200 are conducted, as well as a program schedule is prepared based on the scheduled program information and ID corresponding list data broadcast as the index data to display it on the screen of the CRT display 75 by the user's operation to the remote commander 90. Further, various types of program search and program reservation such as video recording reservation can be conducted by selective designation operation made by the user to the remote commander 90 using plurality kind of items included in the scheduled program information.

Figure 13:
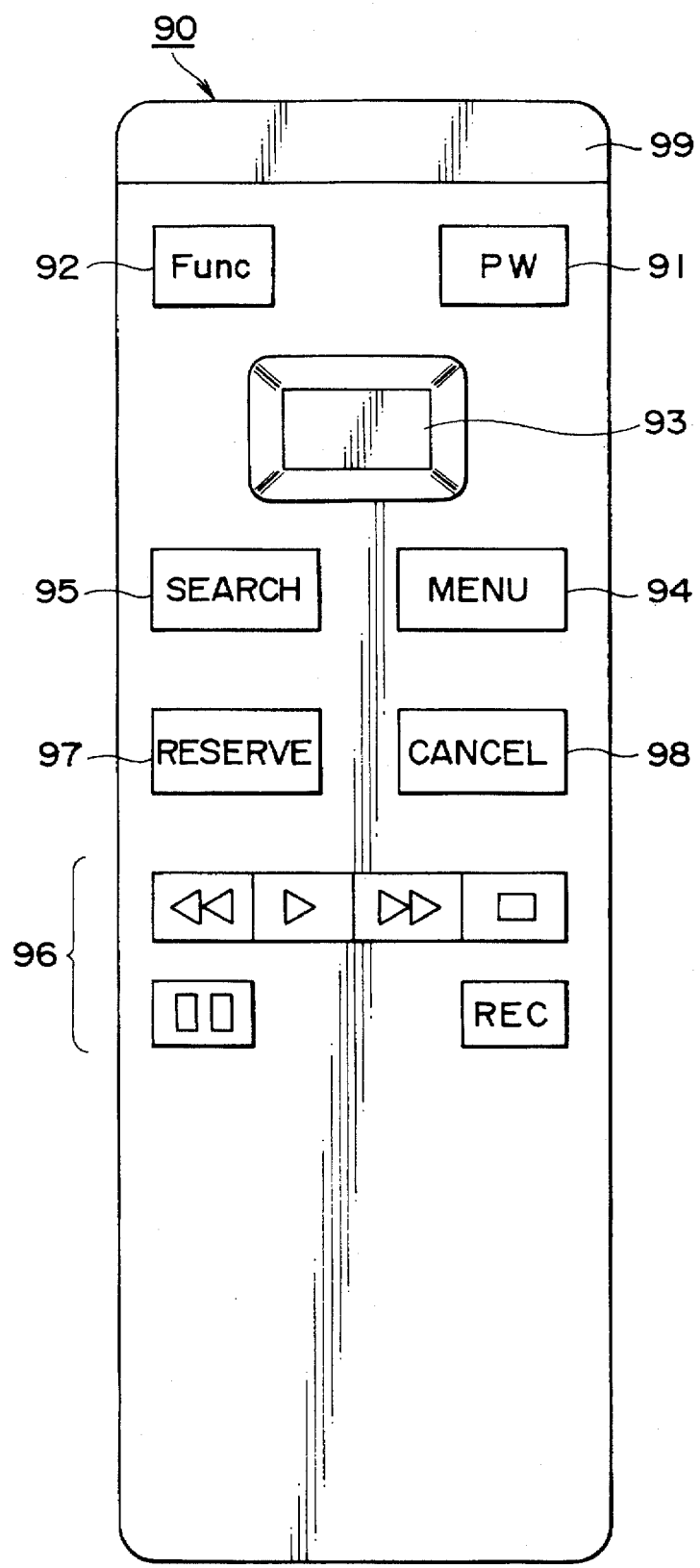
FIG. 13 is a view illustrating an example of a remote commander used in one embodiment of a receiving device according to the present invention.

The remote commander 90 is provided with various kinds of buttons capable of realizing the foregoing functions. In FIG. 13, are shown a power source button 91, a function switching button 92, a joy stick button 93, a menu button 94, a search button 95, various kinds of operation buttons 96 to recording/reproducing device section 200, a program reservation button 97, a cancel button 98 and a remote control signal sending section 99.

The joy stick button 93 functions as a joy stick by moving it in eight directions, namely, upward, downward, leftward, rightward and in oblique directions and can freely move a pointer cursor or indication mark displayed on the screen upward, downward, leftward, rightward and in oblique directions. Further, if the button 93 is depressed, it functions as an enter button (decision button).

Figure 14:
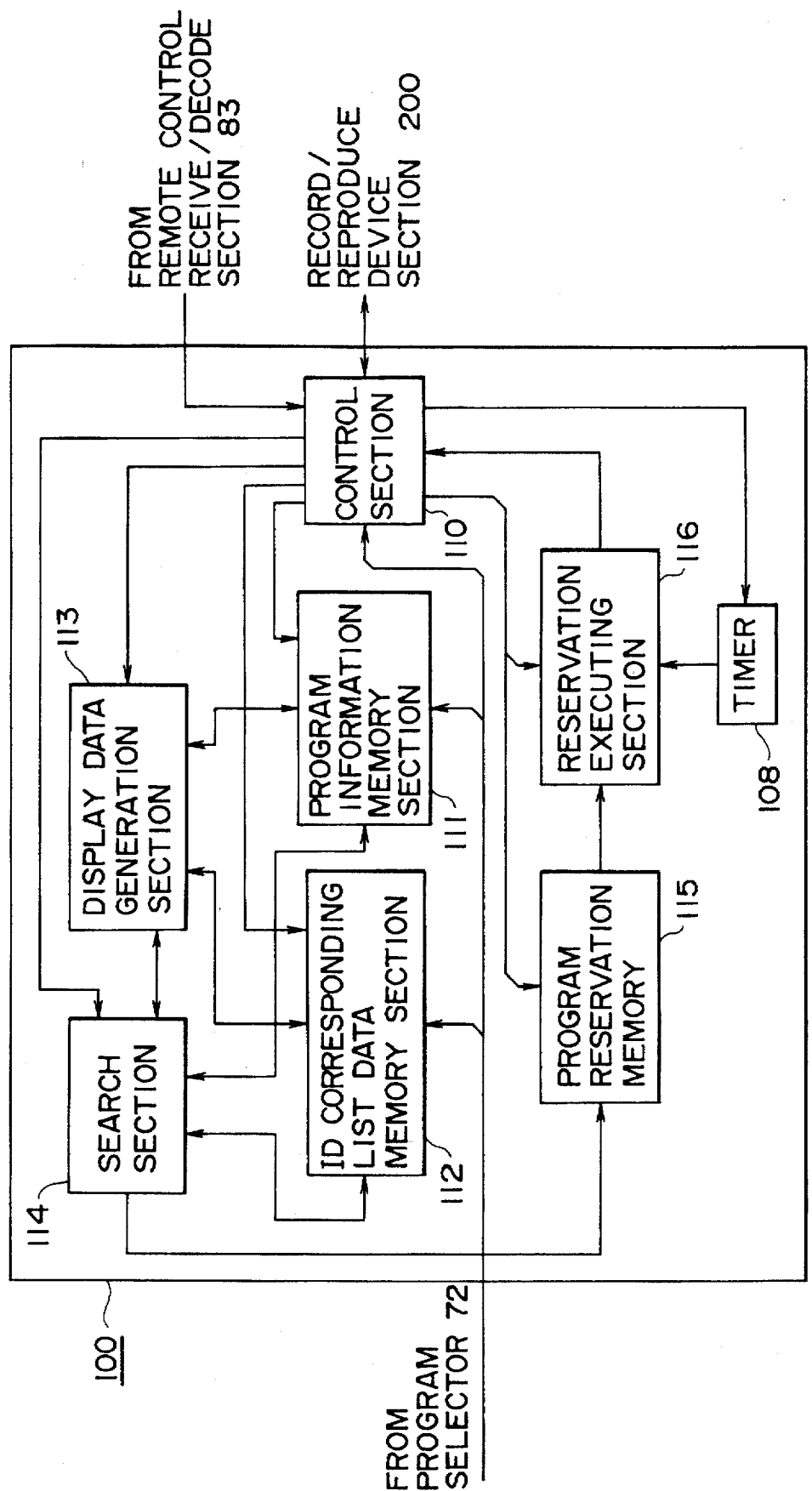
FIG. 14 is a functional block diagram for program search and reserved recording in one embodiment of a receiving device according to the present invention.

FIG. 14 is a functional block diagram illustrating the function of the system control section 100 as a block upon display of a program schedule and program search in accordance with user's request.

When the user inputs a request for the display of the program schedule, for example, by operating the menu button 94 and the joy stick button 93 on the remote commander 90, a remote control signal requesting the display of the program schedule is sent out as an infrared beam from the remote control sending section 99. The remote control signal receiving decoding section 83 receives the remote control signal, decodes the signal and sends it to the control section 110 shown in FIG. 14. The control section 110 prepares the program schedule as described below in accordance with the remote control signal and displays it on the screen 75D.

That is, as described previously, the index data is sent from the program selector 72 to the system control section 100 in accordance with the request or at a predetermined period and the data for the scheduled program information packet 23 in the index data (refer to the program schedule data in FIG. 2) is stored in the program data memory section 111 and the data for the ID-corresponding list table data packet 24 are stored in the ID-corresponding list data memory section 112, respectively.

Upon receiving the request for displaying the program schedule, the control section 110 hands it to the display data generation section 113. The display data generation section 113 converts the program schedule data comprising ID in the program data memory section 111 into the program schedule data comprising text data by reference to the list data for the kind of items and the ID corresponding list data on every kind of items stored in the ID corresponding list data memory section 112 and writes the data in a buffer memory (not illustrated).

Then, the display data generation section 113 prepares the display data for the program schedule from the program schedule data comprising the test data by using character fonts or information for preparing the program schedule provided previously in the ROM 103 of the system control section 100 and sends the data to the video display processing section 74. In this instance, in a case of displaying the display schedule in such a size as can be read easily by the user, since a lot of channels can not be displayed at a time on one screen, a portion of the program schedule is displayed and the data by the amount for the display on one screen is sent from the system control section 100 to the video display processing section 74.

FIG. 15 shows an example of a displayed portion for the program schedule TBL displayed on the screen 75D of the CRT display 75 of the receiving device 70. In the program schedule TBL, since a display frame for the information of each of the programs is restricted, not all the information for the detailed items for a plurality kind of items of the program information PG for each of the programs shown in FIG. 2 are displayed as the program schedule.

Therefore, as the display items for each of the programs of the program schedule of this type, it may be considered to designate fixedly only the items such as program tile, sub title and performer. However, in this example, since the first kind of item to kth kind of item are respectively designated and broadcast by a broadcasting stations as the program information PG or SB for the program schedule data, the displayed contents for each of the programs in the program schedule TBL can be decided in various display modes intended by producers of the program schedule data.

That is, the content of the program can be displayed in various modes of display, for example, by successively displaying from the first kind of item to the ith kind of item of the main program information PD that can be included in within the program display frame to be displayed.

For instance, it is possible to display in a case of a program of a category such as drama or movie, in the order of the category and the program title as "Drama Mr. Postman" in FIG. 15 or, in the case of category such as a music program, in the order of the title and the artist (performer), for example, "TOP 40'S YUMING DREAM COMES TRUE" as shown in FIG. 15. Alternatively, it is also possible to designate so as to use the information regarding the kind of items for the sub program SB as the display data for the program schedule.

Then, for the list data for the kind of items, since the kind of classification items are broadcast for each of the current broadcasting programs, a new program category, if any, can be displayed in the program schedule TBL.

In FIG. 15, time is indicated on the abscissa and the channels (broadcasting stations) are arranged on the ordinate in the displayed program schedule TBL in FIG. 15. When a user operates the joy stick button 93 of the remote commander 90 in the leftward or rightward direction, the displayed program schedule TBL is scrolled along the direction of the time axis. Further, when the user operates the joy stick button 93 in the forward or backward direction, the program schedule TBL is scrolled in the direction of the channels, so that the user can recognize the desired scheduled programs on the time zones and the broad casting stations from the program schedule TBL displayed on the display 75.

The data for the kind of items and the item ID constitute also the search data upon searching the program. Upon searching, the character display for the kind of items and the character display for the detailed items are displayed as the search item (search key) on the screen. That is, the information 55, 64 for the kind of items and the data for the item ID 56, 65 serve both as the display data and the search data.

An example of search using the program table TBL will be explained with reference to the functional block diagram in FIG. 14, and examples of screen display in FIG. 16 and FIG. 17.

The user, for instance, depresses the search button 95 and the menu button 94 of the remote commander 90 to send a request to the remote control receiving/decoding section 83 of the receiving device 70. The control section 110 receives the remote control signal, puts the system control section 100 into the search mode and informs this to the display data generation section 113 and the search section 114.

In this instance, the display data generation section 113 reads out the list data for the kind of items in the ID corresponding list data memory section 112 (refer to FIG. 3) converts the text data for all kind of items into the character font data to form the display data for the initial search menu and display the data by way of the video display processing section 74 on the CRT display 75.

Figure 16A:
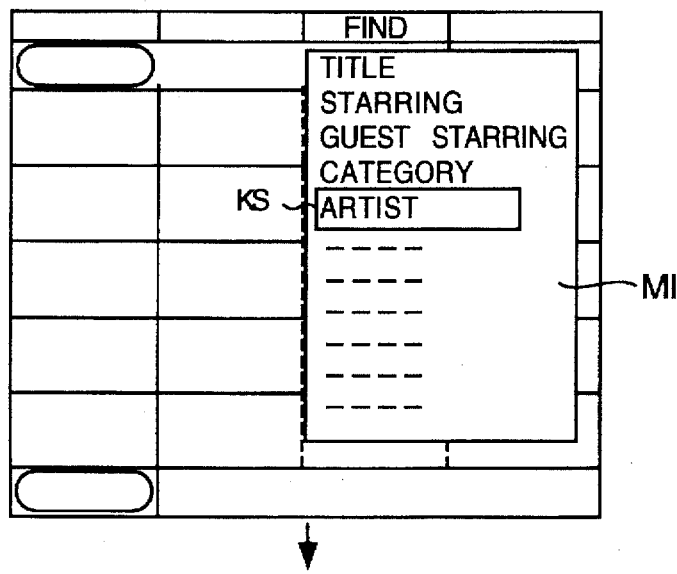
FIGS. 16A–16C are views illustrating an example of a display upon program search in one embodiment of a receiving device according to the present invention.

As a result, as shown in FIG. 16A, an initial search menu M1 comprising character display of the kind of items is displayed being superposed on the program schedule TBL. In the initial search menu M1, a frame mark KS surrounding the character display indicates the item position selected by the user, which is displayed when the user operates the joy stick button 93 of the remote commander 90, for example, in the forward or backward direction. The processing is also conducted in the display data generation section 113. The example in FIG. 16A shows that "ARTIST" is selected from the kind of items.

When the user decides the "ARTIST" as the search item, the joy stick button 93 of the remote commander 90 is depressed in the state shown in FIG. 16A. Then, the control section 110 sends a control signal based on the remote control signal to the display data generation section 113 and the search section 114. The display data generation section 113 informs the search item (represented by ID) as the search key decided by the user to the search section 114.

The search section 114 extracts the ID-corresponding list data for the search items informed from the display data generation section 113 from the ID-corresponding list data stored in the memory section 112 and transfers the data to the display data generation section 113.

The display data generation section 113 converts the received text data of the ID-corresponding list data into display data comprising the character font data, supplies the data by way of the video display processing section 74 to the CRT display 75 and display as a menu M2 on the screen 75D.

Figure 16B:
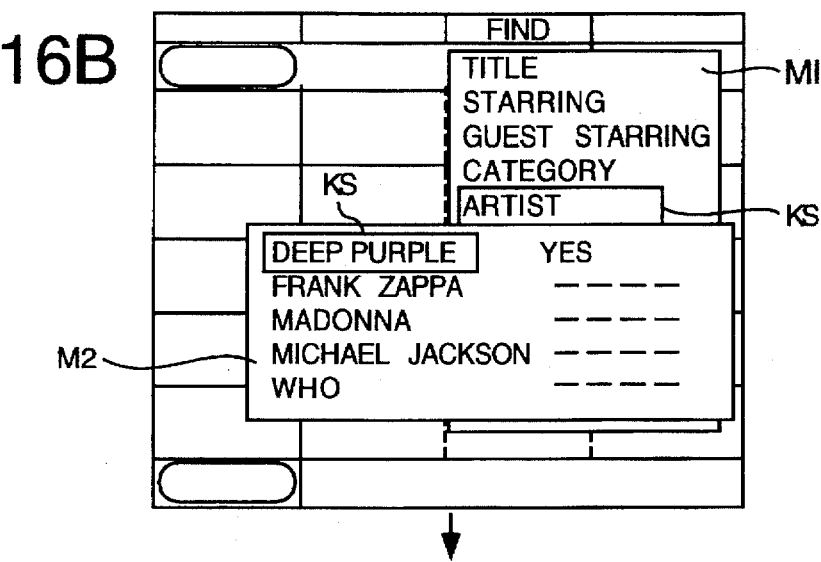

In this example, since the search section 114 extracts the list data corresponding to the performer ID by using ID for the "ARTIST (PERFORMER)" of the list data for the kind of items and hands the data to the display data generation section 113, the display data generation section 113 can form the character display data for all the performers included in the list data corresponding to the performer ID shown in FIG. 16 and can display the performer menu M2 by way of the video display processing section 74 on the CRT display 75.

The user selects the particular item desired to view or listen, the performer in this instance from the menu M2 by using the joy stick button 93 of the remote commander 90 in the same manner as described above. In the menu M2, it is displayed what performers are selected and designated by surrounding the character display for the selected performers with the frame mark KS.

After confirming the selective designation for the particular performers by the frame mark KS, the user depresses the joy stick button 93 of the remote commander 90 to input the designation. Then, the control section 110 sends a control signal based on the remote control signal to the display data generation section 113 and the search section 114. Then, the display data generation section 113 informs the item selectively designated by the use, the performer (represented by ID) in this instance to the search section 114.

The search section 114 searches programs having the performer ID as the detailed item ID for the kind of items using the item ID (performer ID in this instance) selectively designated by the user as the search key. If program sub information SB is present, search is made in the same manner also for the program sub information SB. If the program sub information SB is present, it can also be detected the time at which the selectively designated performer appears in one program.

Figure 16C:
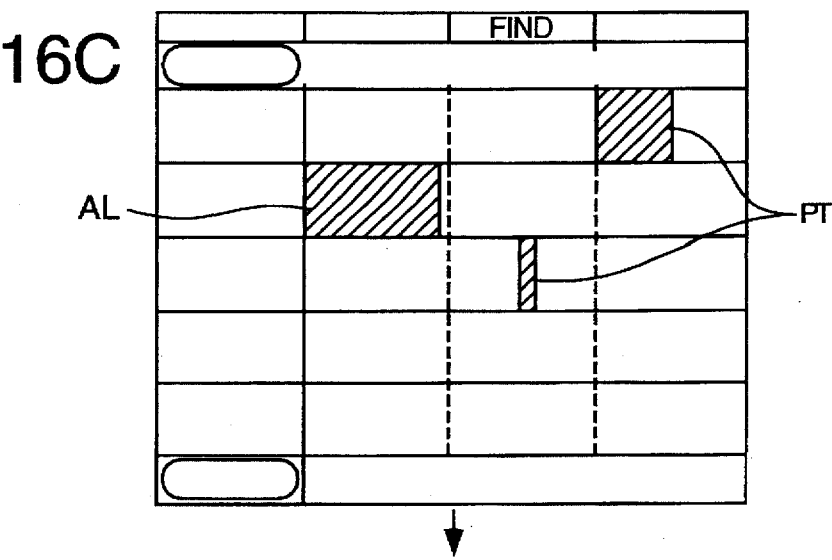

The result is represented on the program schedule as shown in FIG. 16C. Namely, the search menus M1, M2 are erased from the screen 75D. Then, in FIG. 16C, the search result is displayed as shown by hatched lines. In this case, if the program sub information SB is not present in the program as the result of search, an entire frame AL displaying the searched program is shown by monochrome reversal display or change of display color. Further, if the program sub information is present in the program as the result of search, only the time zone in which the performers as the object of the search appears in the program is displayed as PT being shown by hatched lines in FIG. 16C.

If programs to be searched are intended to be further focused, the menu button 94 of the remote commander 90 is depressed again for instance. Then, as shown in FIG. 16(A), the initial search menu M1 is displayed again being superposed on the program schedule TBL. Then the user operates the joy stick button 93 of the remote commander 90 and selectively designates the kind of items as the search key in the same manner as described above. In the case of FIG. 17A, "CATEGORY" is designated as the search key and decided.

Then, the search section 114 extracts the category ID list data from the ID-corresponding list data memory section 112 and hands the data to the display data generation section 113. The display data generation section 113 converts the text data of the category ID list data into the display data of the character font and display the data by way of the video display processing section 74 on the screen 75D of the CRT display 75 as a menu M3 as shown in FIG. 17B.

In the menu M3, the user selectively designates the detailed item as the search key by using the joy stick button 93 of the remote commander 90 in the same manner as described above. Then, when the joy stick button 93 is depressed to input decision for the search key, the search section 114 conducts search for a plurality of programs determined by the previous search in the program schedule BTL by using the selected detailed item as the search key and informs the result of the search to the display data generation section 113.

The display data generation section 113 processes the display data so as to erase the menus M1 and M2 from the screen and conducts display processing such as monochrome reversal display or change of display color as shown by the hatched lines in FIG. 17C on the program schedule TBL only for the program selected by the search. As described above, the program search can be conducted by combining the conditions for the search.

In a case of reserving video recording or sound recording by the recording/reproducing device section 200 for the program thus obtained by the search, if there are plurality number of programs as the result of the search and one of them is to be reserved, the user operates the joy stick button 93 of the remote commander 90 to select and decide the program to be reserved among the programs displayed as the result of the search on the screen 75D and then depresses the reserve button 97. If there are plurality of programs to be reserved, the operation for selecting and deciding the program by the joy stick button 93 is conducted continuously by the number of the programs and then the reserve button 97 is depressed. Further, if all the programs (including a case of a single program as the result of the search) are to be reserved as the result of the search, the function button 92, for instance, is depressed to switch into the state for the reservation of all the programs and then the reserve button 97 of the remote commander 90 is depressed.

The control section 110, upon receiving the remote control signal, requests the search section 114 to transfer the result of the search to the program reserve memory 115 and the program reserve memory 115 is put to a write enable state.

The search section 114 writes the channel information and the information for broadcasting start time and broadcasting end time of the program determined by the search into the program reserve memory 115. Further, in this example, the search section 114 also writes the reserved program title (text data) into the program reserve memory 115. Subsequently, the control section 110 puts the reserve executing section 116 in a driven state.

The reserve executing section 116 compares the broadcasting start time of the reserved program written in the program reserve memory 115 with the current time of the timer 108 and, when the current time reaches the broadcasting start time stored in the program reserve memory 115, sends a request for starting reserved recording and information such as the channel information for the reserved program stored in the memory 15 to the control section 110.

The control section 110 receives the request for the start of the reserved recording from the reserve executing section 116, and starts the program for reserved recording in the ROM 103. That is, it forms information for selecting the frequency for a group of frequencies of the broadcasting channel or the reserved program with reference to the channel allocated information in the index data and sends the same to the program selector 72. Thus, the receiving device 70 receives the reserved program. Then, the video data for the reserved program from the video data decoder section 73 and/or the audio data for the reserved program from the video data decoder section 76 are supplied respectively by way of the encode/decode sections 81, 82 to the recording/reproducing device section 200.

The control section 110 also supplies a control signal to the recording/reproducing device section 200 to put into the recording mode. As a result, in the recording/reproducing device section 200, the video data and/or audio data are recorded in the disc 201 as described previously.

In this case, the title of the program read out from the program reserve memory 115 is supplied to the recording/reproducing device section 200 by way of the reserve executing section 116 and the control section 110, and the program title is recorded in connection with the recorded file information of the program in the UTOC area of the disc 201B.

Since the broadcasting signals in the channel for the reserved program contain the program appended information packet 14 as shown in FIG. 1A described previously and the information for the program title is broadcast in the packet 14, the program title in the program appended information packet can be recorded into the UTOC described above. As the information to be recorded in the UTOC, other information, for example, name of program category, name of performer, etc. can be recorded in place of or together with the program title.

Then, in this example, the information for the broadcasting end time for each of the reserved programs is also stored in the program reserve memory 115 and the reserve executing section 116 informs to the control section 110 that the current time of the timer 103 coincides with the broadcasting end time in the program reserve memory when it judges such coincidence. The control section 110 receives this information and sends a control signal for controlling the recording/reproducing device section 200 from the recording state to the stopping state to the system control section 210 of the recording/reproducing device section 200. Accordingly, the recording/reproducing device section 200 stops recording upon end of the program.

As has been described in the foregoing explanation for the current time information packet 21 included in in the index data of the broadcasting signals, since the timer 108 of the receiving device 70 is calibrated for the time by the current time information in the index data, it is not necessary that the user conducts time compensation for the timer 108.

That is, information indicative of a district in which the receiving device 70 is located, for example, a zip code is registered in the SRAM 105 of the system controller section 100. The district-indicative information is set by the user or registered by a sales shop or service man in the SRAM 105. As the district-indicative information, a toll board telephone number or the like may be used instead of the zip code.

Then, the system controller section 100 of the receiving device 70 takes out the current time information of the packet 21 from the index data extracted from the received signals. The current time information is being broadcast as the standard time as described previously, and the system controller section 100 determines the difference in time in that district from the standard time and adds or subtracts the difference in time to and from the received standard time to calculate the current time in that district. Then, the system controller compares the received or calculated current time with the time shown by the incorporated timer (clock), for example, upon turning the power source to on, or at a predetermined period, and if there is any time difference or a time difference greater than an allowable error, calibrates the time shown by the timer 108 by using the information of the received or the calculated current time.

In this example, if a plurality of programs overlapped with each other with respect to the broadcasting time zones are designated as the reserved programs, a program to be started at an earlier time is preferentially recorded and, after the end of the recording of this program, other overlapping programs are recorded only for the remaining broadcasting time zones.

As described above, the user can reserve the program and conduct reserved video recording or sound recording merely by the operation of selecting and designating the search key, without knowing the information for the broadcasting starting time, etc. of the program or divided subprograms to be reserved.

Description has been made to an example of program search by using the program table TBL. However, program search and, further, search for the sub program units can be conducted as will be explained below irrespective of the program schedule TBL. Then, upon such search, the program schedule for the divided sub program units focused depending on the search items can be displayed on the display screen.

FIG. 18 and FIG. 19, are views for explaining the search method respectively, showing examples of search screen.

Also in this examples, since the processing in the system control section 100 can be expressed by the functional block diagram shown in FIG. 14, explanation will be made at first to an example of FIG. 18 also referring to FIG. 14.

In this example, when a user depresses the search button 95 of the remote commander 90 and, further, depresses the menu button 94, the control section 112 receives a remote control signal from the remote commander 90 and sends a control signal to the display data generation section 113. Then, the display data generation section 113 generates display data of the list table M4 for the kind of items identical with the initial search menu M1 described previously, with reference to the program schedule data in the memory section 111 and the ID-corresponding list data in the memory section 112 and sends them by way of the video display processing section 74 to the CRT display 75. Thus, the list table M4 for the kind of items is displayed on the screen 75D as shown in FIG. 18A.

The user can selectively designate the kind of items as the search key from the list table M4 for the kind of items by operating the joy stick button 93 of the remote commander 90. The kind of items selectively designated can be displayed on the screen, for example, by monochrome reversal display or change of display colors. The processing is also conducted in the display data generation section 113. In FIG. 18A, the selectively designated kind of items is shown by hatched lines, in which "CATEGORY" is selectively designated.

When the joy stick button 93 of the remote commander 90 is depressed by the user to decide the selective designation for the kind of items as the search key, the control section 110 receives the remote control signal and sends a control signal to the display data generation section 113. The display data generation section 113 informs the kind of item decided by the user to be searched to the search section 114.

The search section 114 extracts the ID-corresponding list data for the informed kind of items from the ID corresponding list data stored in the memory section 112 and hands the dame to the display data generation section 113. The display data generation section 113 converts the text data of the ID-corresponding list data into the display data comprising the character font data and supply the data by way of the image display processing section 74 to the CRT display 75 and display the same as a menu M5 on the screen 75D. In this example, the ID-corresponding list data for the category are handed to the display data generation section 113 and the list for the category is displayed as the menu M5 on the screen 75D as shown in FIG. 18B.

The user selects a desired particular item, in this instance, the category from the menu M5 by using the joy stick button 93 of the remote commander 90 in the same manner as described previously. The selected category is displayed by the processing in the display data generation section 113 in the same manner as described above, for example, by monochrome reversal display or change of display color. In the example in FIG. 18B, "STOCK MARKET" is selected.

When the user depresses the joy stick button 93 of the remote commander 90 in this state to input a decision, the control section 110 sends a control signal based on the remote control signal to the display data generation section 113 and the search section 114, and display data generation section 113 informs the ID for the item decided by the user to the search section 114.

The search section 114 conducts program search for the program schedule data in the memory section 111 using the informed item ID as the search key. In this example, the search section 114 search, as the item ID for the kind of item "CATEGORY", a program having ID of "STOCK MARKET" in the program information PG or the program sub information SB. Then, the search section 114 informs the result of the search to the display data generation section 113, for example, the program ID for the program found by the search, the broadcasting start time, the broadcasting end time thereof, program title (ID), subtitle (ID), or program sub ID, the broadcasting start time and the broadcasting end time of the divided sub program, the title (ID) of the divided sub program or the like.

The display data generation section 113 converts the text data from the information of the result of the search into the character font data with reference to the ID-corresponding list data in the memory section 112 and displays the found program or divided sub program together with the broadcasting time thereof as the program table on every items as shown in FIG. 18C. In the illustrated example, display for the broadcasting time comprises the broadcasting start time and the time length of the program and the programs are displayed successively from those having earlier broadcasting start time. The time length is calculated as a difference between the broadcasting end time and the broadcasting start time.

In the case of this example, considering a case of programs having broadcasting time zones overlapped with each other, the search section 114 sends information such as a flag indicating the overlap for the broadcasting time of the programs to the display data generation section 113 if programs obtained as a result of the search overlap to each other in view of the broadcasting time. The display data generation section 113 displays the program having overlap in view of the broadcasting time by changing the display color or attaching mesh or under line based on the information for the overlap of broadcasting time to call the user's attention to the overlap of the broadcasting time. In the example displayed in FIG. 18C, the programs overlapped with each other in view of the broadcasting time are surrounded by dotted lines for calling attention by the display.

FIG. 19 shows another example of the screen display of the search. In this example, an initial search menu M4 based on the list data for the kind of items is as shown in FIG. 19A, in which the kind of item "ARTIST" is selected by the user as the search key.

In this example, since the ID-corresponding list data of the index data in the broadcasting signals contain the list data corresponding to the performer ID, a performer list as shown in FIG. 19B converting the text data for the performer ID list data into characters are displayed as a menu M5.

Then, in the menu M5, when a particular item, in this example, a name of a particular performer is selected by the user as shown by the dotted line in FIG. 19B, the search section 114 searches a program in which the performer appears, or a program in which a music number is played by the performer or the divided sub program. Then, a program tbl for each of items comprising the found title or the sub title of the program or divided sub program, and the broadcasting start time and the broadcasting time length thereof is displayed on the screen 75D of the display 75 as shown in FIG. 19C. FIG. 19C shows an example of displaying the music number as an example of the title name for the divided sub program.

In the foregoing example, a program table tbl for each of items which includes only items designated by the user as the search item key can be obtained, in which the program of a desired category or the program in which desired artist appears can be displayed, as well as the program table on the unit of music number by the artist can be displayed as in the example shown in FIG. 19 which is extremely convenient. That is, a program table on the program element units included in the program can be formed and displayed.

In this case, since not only the program unit but also the information for the broadcasting start time and the broadcasting end time are included in the divided sub unit, the information for the broadcasting time can be displayed not only by the program unit but also by divided subprogram (program element) unit.

Then, it is possible to use a program table tbl for each of items in which the program or the program element is displayed as a result of the search and reserve the video or audio recording for one program or program element, a plurality of selected programs or program elements or all the programs or program elements in the program table by the recording/reproducing device section 200.

That is, in the same manner as a case of the example using the program table TBL shown in FIG. 15, the user operates the joy stick button 93 and the reserve button 97 and, further, the function button 92 of the remote commander 90 to conduct program reserving operation in the program table tbl for each of items displayed on the screen 75D.

Then, in this case, the information for the program table tbl for each of items of the reserved program as well as the information for the channel of the reserved program are stored in the program reserve memory 115. Then, quite in the same manner as in the previous example, recording operation regarding the reserved program or program element is conducted. In this example, the text data portion displayed in the program table tbl for each of items are recorded as the data related to each of the recorded reserved program or program element in the UTOC of the disc 201.

Figure 20:
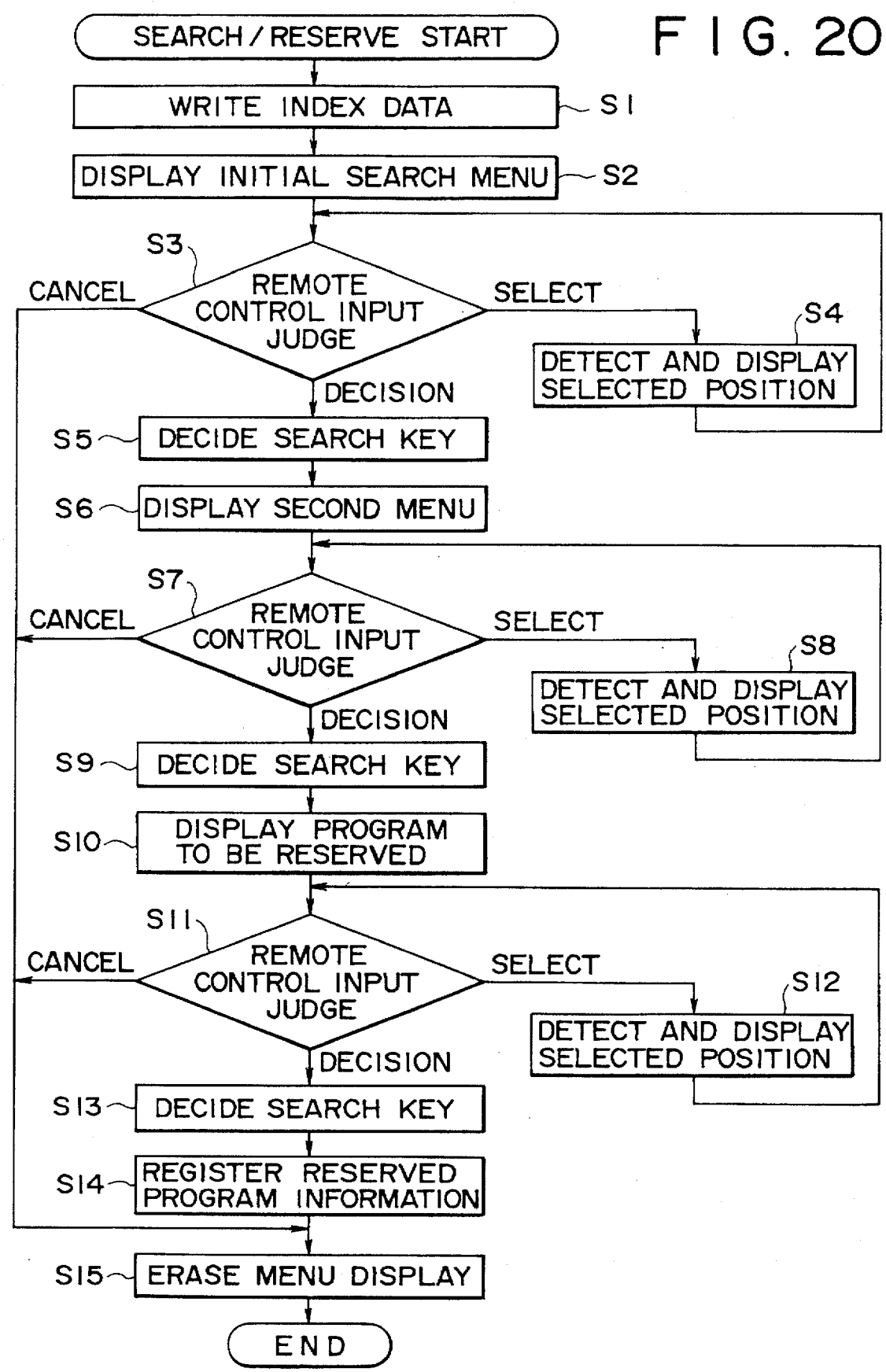
FIG. 20 is a view illustrating a flow chart for one example of program search and program reservation processing in one embodiment of a receiving device according to the present invention.

Then, FIG. 20 is a flow chart for the processing in the system control section 100 upon program search and program reservation described previously and the processing operation will be explained with reference to the flowchart.

When the search and the program reservation are designated at the remote commander 90, the remote control receiving/decoding section 83 receives the remote control signal and informs it to the system control section 100. Then, in this example, the system control section 100 requests the program selector 72 to obtain the packet 23 of the scheduled program information and the ID-corresponding list data packet 24 for the index data of the index channel, receives the ID corresponding list data packet 24 and stores the data in the memory (step S1).

Then, the system control section 100 extracts the list data 32 for the kind of item in the packet 24, prepares the initial search menu M4 shown in FIG. 17 and FIG. 19 on video RAM 106 in accordance with the program in the ROM 103 and by means of the fixed data stored in the ROM 103 (for example, image data or font data) and displays the same on the screen 75D of the display 75 (step S2).

As described above, the user operates the remote commander 90 while observing the initial search menu M4. The system control section 100 detects the operation input from the remote commander 90 and judges whether this is a selective operation for the search item as the search key, a deciding operation for the selected search item or an operation of the cancel button 98 (step S3).

If it is the selective operation for the search item, detection for the selected item and the selective display (monochrome reversal display, change of display color or display by the pointer cursor) is conducted (step S4). If it is the operation of the cancel button 98, it jumps to step S15 to erase the menu display and complete the processing.

As the result of the judgment at the step S3, if it is the deciding operation, the control decides the item as the search key (step S5), reads out the item ID-corresponding table from the ID corresponding list data stored in the memory and displays the menu for the name of the items (refer to menu M5 in FIG. 18 and FIG. 19) (step S6).

Since the user operates the remote commander 90 while observing the menu for the item name, the system control section 100 detects the operation input from the remote commander and judges whether this is a selective operation for the item, a deciding operation for the selected item or an operation to the cancel button 98 (step S7). If it is the selective operation for the search item, detection for the selected item and the selective display (monochrome reversal display, change of display color or display by the pointer cursor) is conducted (step S8). If it is the operation of the cancel button 98, it jumps to step S15 to erase the menu display and complete the processing.

Then, as a result of the judgment at the step S7, if it is the deciding operation, the control decides the selected item (step S9), searches the program information stored in the memory using the ID of the item for the search key and displays the list of the program to be reserved as the result of the search (including the divided sub program here and hereinafter) (refer to the program table tbl for each of the items in FIG. 18 and FIG. 19) (step S10).

Since the user conducts input operation by the remote commander 90 for program reservation while observing the list menu for the programs to be reserved on the screen 75D, the system control section 100 detects the operation input from the remote commander 90 and judges whether this is a selective operation for the reserved program, a deciding operation for the selected reserved program or an operation to the cancel button 98 (step S11).

If this is the selective operation for the reserved program, the control detects the selected program and displays selection (by monochrome reversal display, change of display color or display by the pointer cursor) (step S12). Further, if this is the operation to the cancel button 98, the control jumps to step S15 to erase the menu display and complete the processing.

Then, as the result of judgment at step S11, if this is the deciding operation, the control decides the selected reserved program (step S13), and registers the information for reserved recording or the like of the program in the memory (step S14). Then, the control goes to the succeeding step S15 to erase the menu display and complete the processing.

It may be sometimes a worry that the broadcasting time of the reserved program is changed, for example, by the change of programs after the program reservation. In such a case, the reserved program can be recorded even if the broadcasting time is changed as explained below, by incorporating the program title in the reserved program information to be registered in the memory.

That is, at the registered instance of the broadcasting start time of the reserved program, the title of the program of the program appended information in the designated channel during broadcasting at that instance is compared with the title of the program of the reserved program registered in the memory to confirm if the program under broadcasting is the reserved program or not. Then, if a program different from the reserved program is being broadcast, the broadcasting time is confirmed again by the scheduled program information for the channel or the scheduled program information in the index channel. Then, if the broadcasting time is changed to the later time, the broadcasting start time and the broadcasting end time of the reserved program are changed to those in the scheduled program information and registered being updated in the memory.

In this way, if the broadcasting time for the reserved program is changed and the program is broadcast with a delay, the reserved program can surely be received or recorded.

According to the method of the program search as has been described previously, only the music number of specified artist or singer can be extracted from the broadcasting programs and recorded in the disc. Further, all the particular programs such as stock market can be recorded in one identical disc which is very convenient. Further, if electronic newspapers or like other programs are to be broadcast in the midnight, it is possible for reserved video recording the program in the disc and to view the same in an appropriate occasion, for example, during commutation by using the device for reproducing the disc.

Further, since information regarding the recording file such as a program title is recorded as the information in the UTOC of the disc, it is possible to reproduce the stock market not in the order of recording but in the reverse order from newer information by using the information of the UTOC.

That is, in the mini-disc device, the disc is usually reproduced from the information of older recording date in accordance with the information of the UTOC. However, it is possible to designate reproduction order by a user and reproduce in accordance with the designation while referring to the information in the UTOC, thereby reproducing in the order designated by the user. The receiving device of this embodiment has a rearranged reproduction mode enabling reproduction by the order designated by the user.

Figure 21:
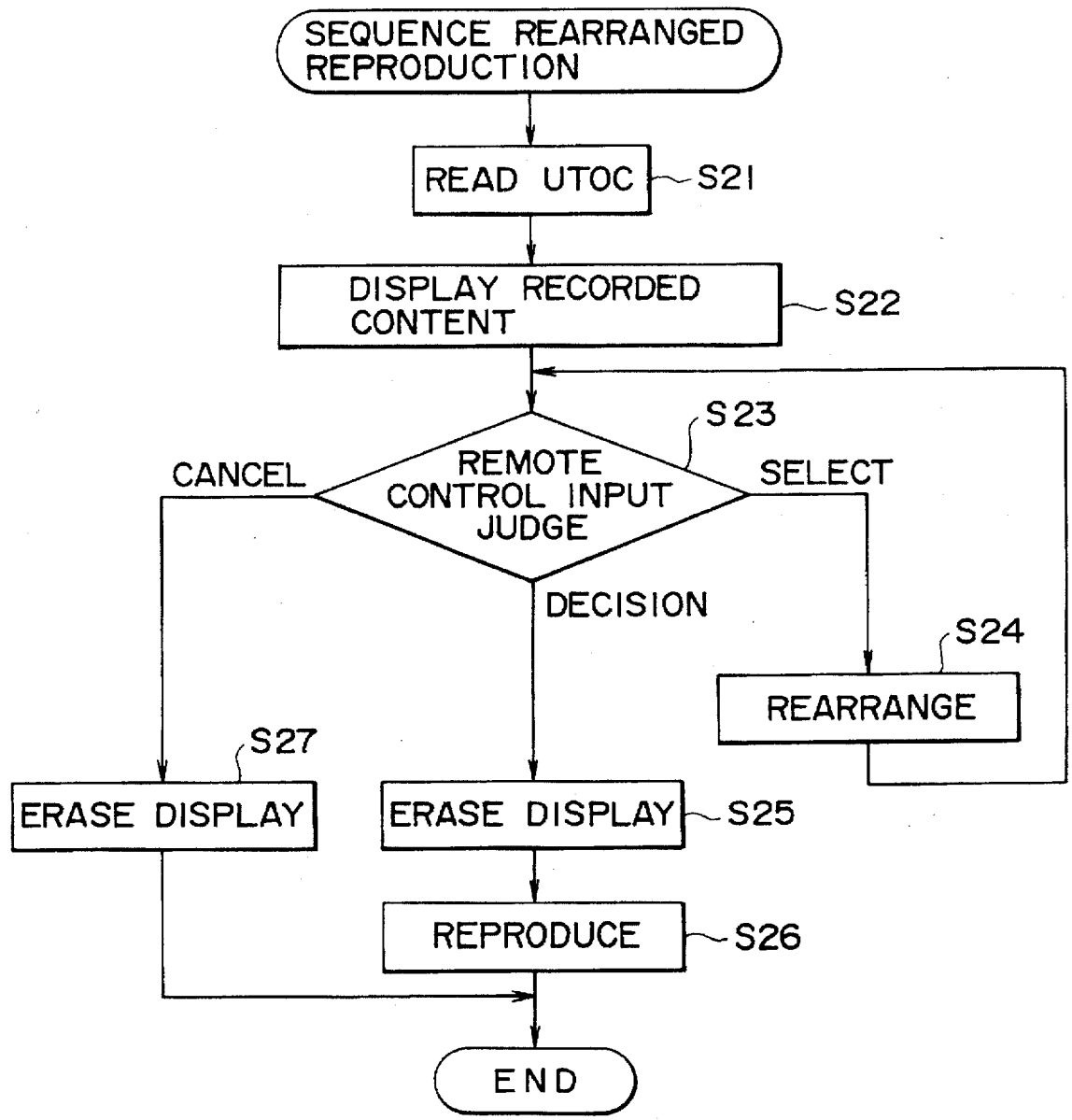
FIG. 21 is a view illustrating a flow chart for one example of a particular reproducing mode processing of a recording/reproducing device section in one embodiment of a receiving device according to the present invention.

FIG. 21 is a flow chart for the processing in the system control section 100 for the rearranged reproduction mode.

When a user operates the remote commander 90 and selects reproduction for rearranged order from the functional menu, the program is started. Then, the data in the UTOC is at first read from the mini-disc 201 (step S21). The system control section 100 forms display data for the information regarding the recorded contents in the disc 201 based on the written UTOC information and supplies the same by way of the video display processing section 74 to the CRT display 75 and display the data (step S22).

For instance, in the example of FIG. 18, when all the programs attached with marks "o" in the program table tbl for each of items in FIG. 18C are reserved and recorded in the disc, the information regarding the title for each of the programs and the broadcasting time are displayed as the list shown in FIG. 22A as the information regarding the recorded contents prepared based on the UTOC information. Further, in the example shown in FIG. 19, all the programs attached with the marks "o" in the program table tbl for each of items in FIG. 19C are reserved and recorded in the disc, the information regarding the sub title, for example, the music number in each of the programs and the broadcasting time (time length) thereof are displayed as a list as shown in FIG. 22B as the information regarding the recorded contents prepared based on the UTOC information.

The user selects a program or music number desired to be reproduced in a plurality of programs or music numbers, listed and displayed on the screen 75D in the desired order of reproduction by using the joy stick button 93 of the remote commander 90 and conducts a deciding operation.

Accordingly, the system control judges which operation the remote control signal from the remote commander 90 corresponds to (step S23).

If this is the selective operation for the program to be reproduced, control detects the selected program and displays the selection (for example, by monochrome reversal display, change of display color or display by pointer cursor) and displays the numeral figure indicating the selected order, as shown by FIG. 22A, near the character display for each of the programs or music numbers (step S24). If the remote control signal corresponds to the operation to the cancel button 98, the control jumps to step S27 and erases the UTOC display and completes the processing.

As a result of the judgment at step S23, if this is the deciding operation, the control erases the UTOC display (step S25), supplies the selectively set reproduced program or reproduced music number and the information for the order thereof to the recording/reproducing device section 200 and sends a control signal for putting the recording/reproducing device section 200 into a reproducing state (step S26). The recording/reproducing device section 200 stores the selected program or the music number and the designated information for the order thereof in the work RAM of the system control section 210 and executes reproduction based thereon. As a result, the recording/reproducing device section 200 reproduces only the selected program or the music number in the designated order.

Since the receiving device in this embodiment has the foregoing rearranged reproducing mode, it can easily conduct rough search using a certain condition as a search key and record all of them in the disc and, subsequently, takes out necessary recorded files and reproduce them in the designated order.

In the above-mentioned embodiment, the recording/reproducing device section 200 uses an opto-magnetic disc device corresponding to the mini-disc but a recording/reproducing device using an optical disc referred to as WO (Write Once) or MO can also be used.

Further, a recording/reproducing device using not an optical disc but a magnetic disc or magnetic tape as a recording medium can also be used as the recording/reproducing device section 200.

Further, although explanations have been made to the example of satellite broadcasting, the present invention is of course applicable also to a case of broadcasting in which digital broadcasting waves are transmitted by way of cables. Further, the present invention is applicable also to a case of existent analog television broadcasting, in which scheduled program information and ID-corresponding list data are multiplied in the same manner as in the multiplexed teletext signals, for example, in a blank horizontal section of a vertical blanking period of television signals for broadcasting. Furthermore, the present invention is applicable not only to television broadcasting but also to radio broadcasting.

Further, the remote commander is not restricted to the above-mentioned embodiment but it may be a mouse-like arrangement in which an operation button is displayed on a screen in a icon-like configuration and designating it by a pointer cursor.

Further, although explanations have been made to a case of search by designating item by item in a case of program search, it is possible to search by simultaneously setting a plurality of search conditions. Further, more detailed search can be conducted within a shorter period of time by searching based on logic AND or logic OR operation for a plurality of search conditions.

Furthermore, in the foregoing embodiment, although reserved recording such as reserved video recording or sound recording is conducted for the searched programs, the reserved program may only be viewed or listened. Further, the display of the receiving device may be liquid crystal display or like other display instead of the CRT display.

What is claimed is:

1. A program information broadcasting method comprising the steps of:

providing a plurality of classification items, each including a plurality of detailed items for recognizing broadcasting programs per se or program elements included in each of the broadcasting programs, forming scheduled program information by representing the contents for each of said broadcasting programs with said classification items and detailed items, and representing said classification items and detailed items with first and second identification data, respectively; and broadcasting said scheduled program information and corresponding table data for the data for the character display of said classification items and said detailed items corresponding to said first and second identification data.

2. A program information broadcasting method according to claim 1, wherein said scheduled program information includes information for recognizing broadcasting start time and broadcasting end time on each program to be broadcast.

3. A program information broadcasting method according to claim 1, wherein said scheduled program information includes information for recognizing broadcasting start time and broadcasting end time on each program element unit included in each of the programs to be broadcast.

4. A program information display method comprising the steps of:

extracting, from received broadcast wave signals, scheduled program information in which the contents of programs to be broadcast are represented by a plurality of classification items and detailed items for each of said classification items, and said classification items and said detailed items are represented by first and second identification data, respectively, and corresponding table data for character display of said classification items and said detailed items corresponding to said first and second identification data replacing said extracted identification data of said scheduled program information with data for corresponding character display by using said extracted corresponding table data, thereby generating program schedule data; and displaying the program schedule for the contents of the program to be broadcast by character display on a display based on the program schedule data.

5. A program information display method according to claim 4, wherein the method further comprises the step of extracting, from said scheduled program information, a program having identical classification items or detailed items with those designated by a user as program information and displaying said extracted program on a display in a form recognizable to the user.

6. A program information display method according to claim 4, wherein the method further comprises the step of extracting, from said scheduled program information, program element comprising identical classification items or detailed items with those designated by a user, generating program schedule data including the extracted program element and displaying the program schedule on the display based on the program schedule data.

7. A program information display method according to claim 5, wherein the method further comprises the step of extracting, from said received broadcast wave signals, information for recognizing broadcasting start time and broadcasting end time for each program to be broadcast, and displaying information regarding the broadcasting time of the program in a wherein the broadcasting start time and the broadcasting end time can be recognized corresponding to each of the corresponding programs in the broadcasting schedule.

8. A program information display method according to claim 5, wherein the method further comprises the step of extracting, from said received broadcast wave signals, information for recognizing broadcasting start time and broadcasting end time for each program element in each program to be broadcast, and displaying the information regarding the broadcasting start time and the broadcasting end time corresponding to each of the elements in the program schedule.

9. A receiving device for displaying a program schedule comprising:
   a program information extraction means for extracting, from received broadcast wave signals, scheduled program information in which the contents of programs to be broadcast are represented by a plurality of classification items and detailed items for each of said classification items, and said classification items and the detailed items are represented, respectively, by first and second identification data, and corresponding table data for the data for character display of said classification items and said detailed items corresponding to said first and second identification data,
   a program schedule data generation means for replacing said identification data of said scheduled program information with the data for corresponding character display by using the corresponding table data thereby generating program schedule data; and
   a display control means for displaying the program schedule based on said program schedule data generated by said program schedule data generation means on a display screen.

10. A receiving device according to claim 9, further including key input means for selecting said classification items or detailed items
   wherein said program schedule data generation means extracts programs or program elements having identical classification items or detailed items with those selectively designated depending on the selective designation at said key input means from the scheduled program information for putting the extracted program or the program elements in a form recognizable to a user; and
   wherein said display control means conducts display based on said display data.

11. A receiving device according to claim 10, wherein said program information extraction means also extracts the time information regarding the scheduled broadcasting time for each program to be broadcast,
   said key input means has a key input section for designating a program or program elements desired by a user with reference to the program schedule displayed on the display screen, and said device further comprises;
   a control means for selectively receiving the program or the program elements designated by said key input section at the scheduled broadcasting time of the program or the program elements by using the time information regarding said extracted scheduled broadcasting time.

12. A receiving device according to claim 11, wherein the device further includes a recording/reproducing device section; and
   a program or program elements designated by said key input section and selectively received by said control means at the scheduled broadcasting time are recorded in said recording/reproducing device section.

13. A receiving device according to claim 12, wherein said recording/reproducing device section records the information regarding the decoded content in a recording area separate from the main recording data, and said device further comprises:
   a recording means for recording received signals of the program or the program elements designated by said key input section and selectively received by said control means at the scheduled broadcasting time by said recording/reproducing device section in a main recording data area of the recording medium and recording information regarding said recorded received signals in a recording area separate from said main recording data area of said recording medium; and
   a reproducing means for reproducing the information regarding the received signals from said recording medium and displaying the same on a display screen.

14. A receiving device according to claim 13, wherein
   said key input means includes a key input section for optionally selecting a program or program element units to be reproduced by a user from the recording medium with reference to the information regarding the recorded contents and displayed on the display screen; and
   wherein said device extracts and reproduces the program or the program element units selected by said key input section from said recording medium.

15. A receiving device according to claim 14, wherein said device is capable of designating a reproducing order for the selected program or the program element units by said key input means and has a function of reproducing the selected program or the program element units in accordance with the designated reproducing order.

16. A receiving device according to claim 9, further including means for receiving said broadcast wave signals from a satellite transmission.

17. A receiving device according to claim 9, further including a program selector for extracting index information from said broadcast wave signals.

18. A receiving device according to claim 17, further including a system control section which receives said index information from said program selector and recognizes at least one frequency to which a selected channel is allocated.

19. A receiving device according to claim 18, wherein said system control section includes a microcomputer.

20. A receiving device according to claim 12, wherein said recording/reproducing device section includes an opto-magnetic disc.

21. A method for searching for a desired program element, comprising the steps of:
   receiving program scheduling information for a plurality of programs, each of said programs having associated program elements;
   selecting a program type to search for said desired program element;
   searching said program type to identify programs having said desired program element; and
   displaying at least a portion of said program scheduling information for said searched programs having said desired program element.

22. A method according to claim 21, wherein said selected program type is selected from a menu of available program types.

23. A method according to claim 22, wherein said selected program type is selected by using a remote commander.

24. A method according to claim 21, wherein a desired searched program having said desired program element is selected from a menu of available searched programs.

25. A method according to claim 24, wherein said desired searched program is selected by using a remote commander.

26. A method according to claim 21, wherein said program scheduling information includes channel information and broadcast start and stop times and said channel information and said broadcast stop and start times are displayed on ordinate and abscissa axes, respectively, of a display.

27. A method for searching for a desired program element to enable reserve recording, comprising the steps of:

receiving a program information data packet having program scheduling information for a plurality of programs each having program elements, wherein program elements indicative of a program type are grouped together to form a plurality of program type lists each identified by a program type designation indicative of associated program elements;

displaying each said program type designation on a first screen menu;

selecting a program type designation from said first screen menu which is indicative of said desired program element;

displaying a second menu of program elements associated with said selected program type designation, wherein said second menu of program elements includes said desired program element;

selecting said desired program element from said second menu of program elements;

searching said programs to identify programs which include said desired program element;

displaying a third menu of searched programs;

selecting at least one of said searched programs from said third menu of searched programs; and registering said selected searched programs for reserve recording.

28. A method according to claim 27, further including a program table for displaying said searched programs, wherein said program table includes broadcasting stop and start times for said searched programs.

29. A method according to claim 27, wherein selection of said desired program type designation, said desired program element and said searched programs is shown by a monochrome reversal display.

30. A method according to claim 27, wherein selection of said desired program type designation, said desired program element and said searched programs is shown by changing display color.

31. A method according to claim 27, wherein selection of said desired program type designation, said desired program element and said searched programs is shown by a pointer cursor.

32. A method according to claim 27, wherein said program type designations include general categories and performer.

33. A method according to claim 27, wherein said program information data packet is stored in memory.

34. A method according to claim 27, wherein said steps of selecting a program type designation, said desired program element and said at least one of said searched programs are performed by using a remote controller.

35. A method for searching for a desired program element to enable reserve recording, comprising the steps of:

receiving a program information data packet having program scheduling information for a plurality of programs each having program elements receiving an identification data packet wherein said program elements are grouped together according to program type to form a plurality of program type lists each identified by a program type designation indicative of associated program elements, wherein said program information data packet and identification data packets are stored in memory; displaying each said program type designation on a first screen menu;

selecting a program type designation from said first screen menu which is indicative of said desired program element wherein said program type designations include general categories and performer;

displaying a second menu of program elements associated with said selected program type designation, wherein said second menu of program elements includes said desired program element;

selecting said desired program element from said second menu of program elements;

searching said programs to identify programs which include said desired program element;

displaying a third menu of searched programs;

selecting at least one of said searched programs from said third menu of searched programs; and registering said selected searched programs for reserve recording.

36. A method according to claim 35, further including a program table for displaying said searched programs, wherein said program table includes broadcasting stop and start times for said searched programs.

37. A method according to claim 35, wherein selection of said desired program type designation, said desired program element and said searched programs is shown by a monochrome reversal display.

38. A method according to claim 35, wherein selection of said desired program type designation, said desired program element and said searched programs is shown by changing display color.

39. A method according to claim 35, wherein selection of said desired program type designation, said desired program element and said searched programs is shown by a pointer cursor.

40. A method according to claim 35, wherein said steps of selecting a program type designation, said desired program element and said at least one of said searched programs are performed by using a remote controller.

41. A method according to claim 35 further including the step of recording said selected searched programs.

42. A method according to claim 35 further including the step of playing back said recorded searched programs.

43. A method according to claim 35 wherein said identification data packet includes list data for the types of items, list data corresponding to the program title identification, list data corresponding to subtitle identification, list data corresponding to performer identification and list data corresponding to category identification.

44. A method according to claim 35, wherein said step of searching is initiated by selecting a find function from a fourth menu of available functions.

* * * * *